(12) United States Patent
Ebata

(10) Patent No.: US 7,925,846 B2
(45) Date of Patent: Apr. 12, 2011

(54) COMPUTER SYSTEM AND GARBAGE COLLECTION METHOD OF DISK SPACE

(75) Inventor: Atsushi Ebata, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 534 days.

(21) Appl. No.: 12/081,855

(22) Filed: Apr. 22, 2008

(65) Prior Publication Data

US 2009/0198946 A1 Aug. 6, 2009

(30) Foreign Application Priority Data

Feb. 4, 2008 (JP) ................................. 2008-024531

(51) Int. Cl.
*G06F 13/00* (2006.01)
(52) U.S. Cl. ....................................................... 711/154
(58) Field of Classification Search ........................ None
See application file for complete search history.

(56) References Cited

U.S. PATENT DOCUMENTS

| 7,340,571 | B2 * | 3/2008 | Saze | 711/154 |
| 2006/0053250 | A1 * | 3/2006 | Saze | 711/114 |
| 2006/0242382 | A1 * | 10/2006 | Griess et al. | 711/170 |
| 2007/0255925 | A1 | 11/2007 | Serizawa et al. | |

* cited by examiner

*Primary Examiner* — Brian R Peugh
(74) *Attorney, Agent, or Firm* — Volpe and Koenig, P.C.

(57) ABSTRACT

A processor of a management computer acquires the free disk space amount of a disk pool, acquires the invalid disk space amount from a plurality of host computers, determines a host computer to which the instruction for the physical disk space collection is issued on the basis of the invalid disk space amount, and judges that the free disk space amount is smaller than a predetermined threshold value before transmitting a GC control request to the determined host computer; another processor generates and transmits invalid disk space position information indicating the position of the invalid disk space in a virtual volume in cases where a host investigation request is received; and the other processor collects the physical disk space of a physical disk allocated to the storage disk space of the virtual volume in the disk pool.

17 Claims, 35 Drawing Sheets

FIG. 2

| PARAMETER NAME | CODE | VALUE (EXAMPLE) |
|---|---|---|
| INVESTIGATION PERIOD | Tjdg | 14:00 |
| GC START FREE DISK SPACE RATIO (%) | Rstart | 20 |
| GC END FREE DISK SPACE RATIO (%) | Rend | 30 |
| MINIMUM COLLECTED DISK SPACE RATIO (%) | Rcllct-min | 10 |
| MAXIMUM CPU UTILIZATION (%) | Rcpu-max | 80 |
| MAXIMUM STANDARDIZED I/O LOAD (K IOPS/GB) | Rio-unit-max | 0.05 |

FIG. 3

| PARAMETER NAME | CODE | VALUE (EXAMPLE) |
|---|---|---|
| 1220 — THE AMOUNT OF TOTAL DISK SPACE ON DISK POOL (GB) | Qall | 3000 |
| 1221 — THE AMOUNT OF FREE DISK SPACE ON DISK POOL (GB) | Qrest | 500 |
| 1222 — THE AMOUNT OF GC START FREE DISK SPACE (GB) | Qstart | 600 |
| 1223 — THE AMOUNT OF GC END FREE DISK SPACE (GB) | Qend | 900 |
| 1224 — THE TARGET AMOUNT OF COLLECTED DISK SPACE (GB) | Qcllct | 400 |
| 1225 — THE MINIMUM AMOUNT OF COLLECTED DISK SPACE (GB) | Qcllct-min | 40 |

| CORRESPONDING BIT OF FS MAP | CORRESPONDING BIT OF FS WRITTEN MAP | MEANING OF BLOCK |
|---|---|---|
| 0 | 0 | UNUSED BLOCK |
| 0 | 1 | INVALID BLOCK |
| 1 | 0 | (NON-EXISTENT CASE) |
| 1 | 1 | USED BLOCK |

| ID | HOST NAME | STATE | INVESTIGATION RESULT ||||||| GC EXECUTION ORDER | GC RESULT |||||||
|---|---|---|---|---|---|---|---|---|---|---|---|---|---|---|---|
| | | | CPU UTILIZATION (%) | TOTAL || GC TARGET || | | COLLECTED ||| UNCOLLECTED || GC FAILURE ||
| | | | | THE NUMBER OF FS | INVALID DISK SPACE | THE NUMBER OF FS | INVALID DISK SPACE | | | THE NUMBER OF FS | INVALID DISK SPACE | ERROR OF MEASURE-MENT | THE NUMBER OF FS | INVALID DISK SPACE | THE NUMBER OF FS | INVALID DISK SPACE |
| 1 | Host-1 | GC FAILURE | 72 | 5 | 59 | 5 | 59 | 4 | 4 | 50 | 0 | 0 | 0 | 1 | 9 |
| 2 | Host-2 | GC SUCCEEDED | 8 | 5 | 123 | 4 | 102 | 2 | 4 | 102 | 0 | 1 | 21 | 0 | 0 |
| 3 | Host-3 | GC AVOIDED | 91 | 5 | 42 | 0 | 0 | 6 | 0 | 0 | 0 | 5 | 42 | 0 | 0 |
| 4 | Host-4 | INVESTIGATION FAILURE | -1 | 0 | 0 | 0 | 0 | -1 | 0 | 0 | 0 | 0 | 0 | 0 | 0 |
| 5 | Host-5 | GC SUCCEEDED | 5 | 5 | 129 | 5 | 129 | 1 | 5 | 128 | 1 | 0 | 0 | 0 | 0 |
| 6 | Host-6 | GC SUSPENDED | 55 | 5 | 77 | 5 | 77 | 3 | 4 | 70 | 0 | 1 | 7 | 0 | 0 |
| 7 | Host-7 | GC SUSPENDED | 3 | 5 | 58 | 5 | 58 | 5 | 3 | 39 | 1 | 1 | 10 | 1 | 8 |

| FS ID | FS NAME | CORRESPON-DING VVOL | SIZE (GB) | MAXIMUM I/O LOAD (K IOPS) | INVESTIGATION RESULT | | GC TARGET | GC EXECUTION ORDER | GC RESULT | | | GC COMPLETE | |
|---|---|---|---|---|---|---|---|---|---|---|---|---|---|
| | | | | | I/O LOAD (K IOPS) | INVALID DISK SPACE SIZE (GB) | | | SUCCESS | FAILURE | AVOIDED | ACTUAL RESULTS | ERROR OF MEASUREMENT (GB) |
| 1 | FS7-1 | VVOL31 | 1000 | 50 | 34 | 8 | 1 | 5 | 0 | 1 | 0 | 0 | 0 |
| 2 | FS7-2 | VVOL32 | 2000 | 100 | 4 | 16 | 1 | 1 | 1 | 0 | 0 | 15 | 1 |
| 3 | FS7-3 | VVOL33 | 1000 | 50 | 6 | 10 | 1 | 3 | 1 | 0 | 0 | 10 | 0 |
| 4 | FS7-4 | VVOL34 | 1000 | 50 | 55 | 10 | 0 | 4 | 0 | 0 | 1 | 0 | 0 |
| 5 | FS7-5 | VVOL35 | 1000 | 50 | 12 | 14 | 1 | 2 | 1 | 0 | 0 | 14 | 0 |

| | PARAMETER NAME | CODE | VALUE (EXAMPLE) |
|---|---|---|---|
| 1210 | INVESTIGATION PERIOD | Tjdg | 14:00 |
| 1211 | GC START FREE DISK SPACE RATIO (%) | Rstart | 20 |
| 1212 | GC END FREE DISK SPACE RATIO (%) | Rend | 30 |
| 1213 | MINIMUM COLLECTED DISK SPACE RATIO (%) | Rcllt-min | 10 |
| 1214 | MAXIMUM CPU UTILIZATION (%) | Rcpu-max | 80 |
| 1215 | MAXIMUM STANDARDIZED I/O LOAD (K IOPS/GB) | Rio-unit-max | 0.05 |
| 1541 | PERMITTED MIGRATION CPU UTILIZATION | Rcpu-mig | 15 |

| ID | HOST NAME | DURING INVESTIGATION | | FLUCTUATION OF THE NUMBER OF VIRTUAL HOSTS | POST-MIGRATION | |
|---|---|---|---|---|---|---|
| | | THE NUMBER VIRTUAL HOSTS | CPU UTILIZATION | | THE NUMBER OF VIRTUAL HOSTS | CPU UTILIZATION |
| 1 | Host-A | 5 | 98 | -2 | 3 | 68 |
| 2 | Host-B | 1 | 10 | +1 | 2 | 25 |
| 3 | Host-C | 1 | 2 | +1 | 2 | 17 |
| 1551 | 1552 | 1553 | 1554 | 1555 | 1556 | 1557 |

GC EXECUTION ORDER →

156

| VIRTUAL HOST | | PHYSICAL HOST NAME | STATE | INVESTIGATION RESULT | | | | | | MIGRATION DESTINATION PHYSICAL HOST | GC RESULT | | | | | | | |
|---|---|---|---|---|---|---|---|---|---|---|---|---|---|---|---|---|---|---|
| | | | | CPU UTILIZATION (%) | TOTAL | | GC TARGET | | | | COLLECTED | | MEASUREMENT ERROR | UNCOLLECTED | | GC FAILURE | |
| ID | HOST NAME | | | | FS NUMBER | INVALID DISK SPACE | FS NUMBER | INVALID DISK SPACE | | | THE NUMBER OF FS | INVALID DISK SPACE | | THE NUMBER OF FS | INVALID DISK SPACE | THE NUMBER OF FS | INVALID DISK SPACE |
| 1 | vHost-1 | Host-A | GC SUCCEEDED | 15 | 5 | 59 | 5 | 59 | 4 | Host-B | 4 | 50 | 0 | 0 | 0 | 1 | 9 |
| 2 | vHost-2 | Host-A | GC SUCCEEDED | 12 | 5 | 123 | 4 | 102 | 2 | - | 4 | 102 | 0 | 1 | 21 | 0 | 0 |
| 3 | vHost-3 | Host-A | GC SUCCEEDED | 26 | 5 | 42 | 0 | 0 | 6 | - | 5 | 42 | 0 | 0 | 0 | 0 | 0 |
| 4 | vHost-4 | Host-A | GC SUCCEEDED | 30 | 5 | 10 | 0 | 0 | 7 | - | 5 | 10 | 0 | 0 | 0 | 0 | 0 |
| 5 | vHost-5 | Host-A | GC SUCCEEDED | 15 | 5 | 129 | 5 | 129 | 1 | Host-C | 5 | 128 | 1 | 0 | 0 | 0 | 0 |
| 6 | vHost-6 | Host-B | GC SUCCEEDED | 10 | 5 | 77 | 5 | 77 | 3 | - | 4 | 70 | 0 | 1 | 7 | 0 | 0 |
| 7 | vHost-7 | Host-C | GC SUCCEEDED | 2 | 5 | 58 | 5 | 58 | 5 | - | 3 | 39 | 1 | 1 | 10 | 1 | 8 |

12300 12301 15601 12302 12306 12307 12308 12309 12310 12304 15602 12311 12312 12313 12314 12315 12316 12317

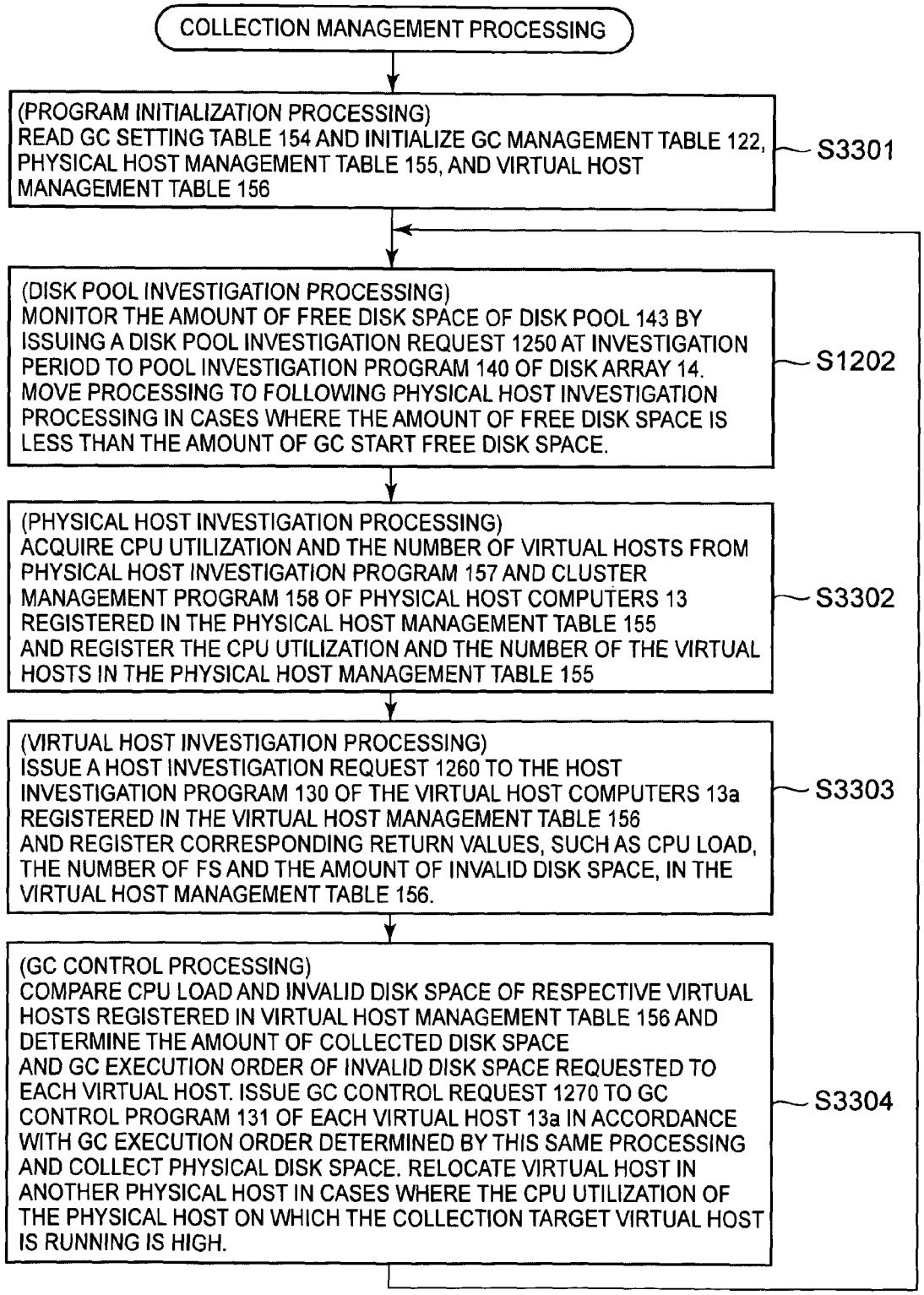

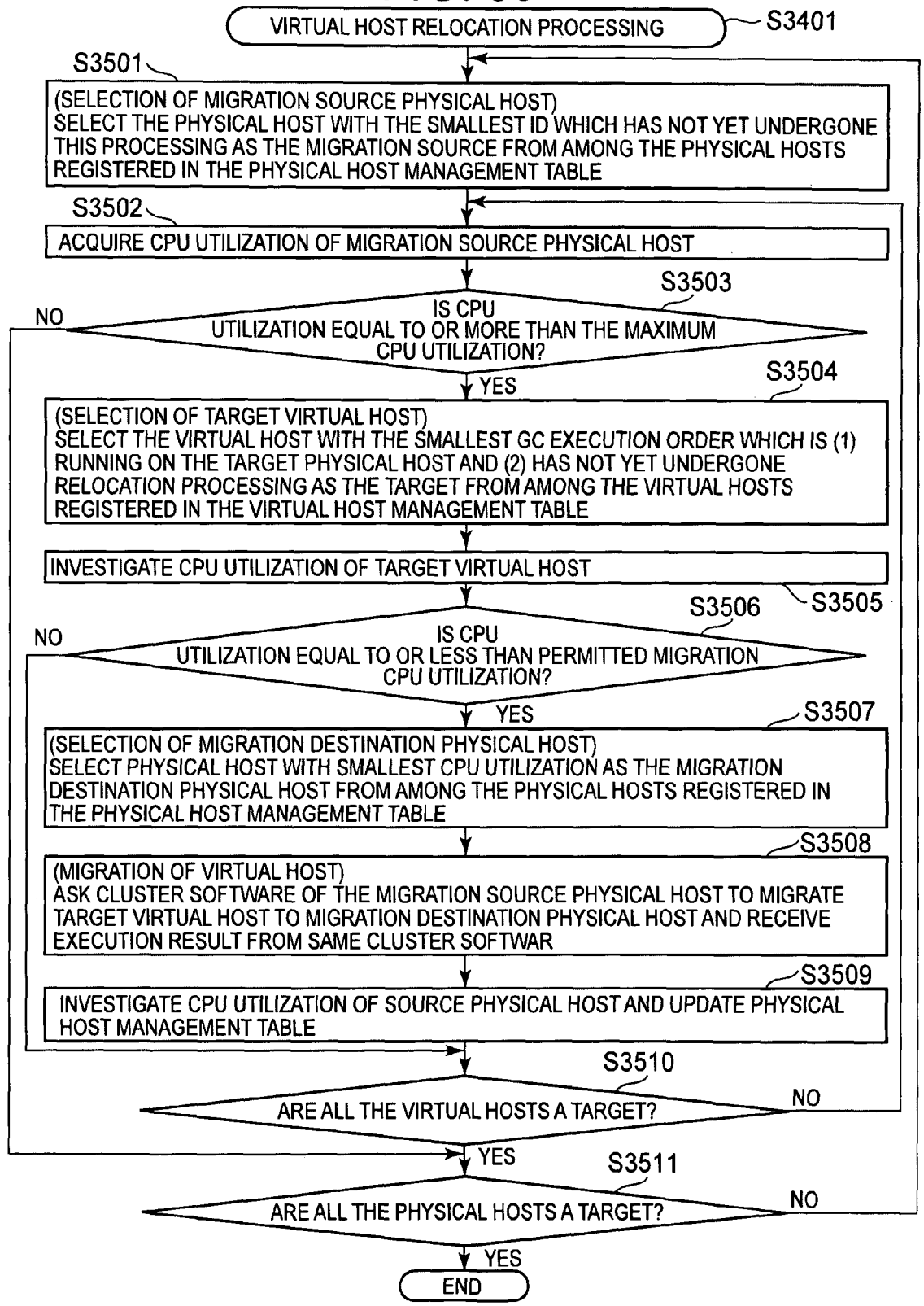

COMPUTER SYSTEM AND GARBAGE COLLECTION METHOD OF DISK SPACE

CROSS-REFERENCE TO PRIOR APPLICATION

This application relates to and claims the benefit of priority from Japanese Patent Application number 2008-024531, filed on Feb. 4, 2008 the entire disclosure of which is incorporated herein by reference.

BACKGROUND OF THE INVENTION

Amid the increase in demand for a reduction in the Total Cost of Ownership (TCO) of a company information system and for reduced power consumption, over-provisioning of storage has become problematic. The over-provisioning involves the failure of capacity planning prior to the introduction of a system and the mounting of a greater number of disks than the disk capacity which the host computer actually requires. The over-provisioning produces an increase in the TCO due to the wasteful investment in equipment in the information system and causes the wasteful power consumption which is caused by the running of unused disks.

Technology which serves to avoid over-provisioning has in recent years included the installation of thin provisioning in the disk arrays. This is a virtual disk technology which provides a host computer with a virtual disk volume and allocates physical disk space from a pool of backend physical disks in accordance with the writing of data. According to this technology, a plurality of host computers share a single physical disk pool via a virtual disk volume and physical disk space is allocated to the virtual disk volume in accordance with the amount of stored data. As a result, because there is no need to provide each host computer with a capacity margin, the total disk capacity of the whole system is reduced.

However, there remain problems with thin provisioning of a normal disk array from the perspective of the capacity efficiency while the system is running. The disk array does not possess information on the file system of the host computer. Hence, the disk array is unable to know that a file has been erased from the file system of the host computer and that the physical disk space is not being used. After the creation of the file system, the physical disk space allocated to the virtual volume is not collected until the file system has been erased. For this reason, in a system in which the physical disks are exhausted, another file system is unable to utilize an unused physical disk even when a large quantity of files in a certain file system are erased. As a result, the disk utilization efficiency of the whole system is reduced.

As a technology for solving the problem of capacity efficiency with such thin provisioning, the technology that appears in Japanese Application Laid Open No. 2005-11316, for example. According to this technology, the disk array reads a journal log of the file system from a specified disk space (journal disk space) of the corresponding virtual volume, analyzes the content, detects the erasure of files by the file system and specifies the disk space of the erased files, and collects the corresponding physical disk space from the virtual disk volume. That is, the corresponding physical disk space is disk space that can be allocated.

Furthermore, Japanese Application Laid Open No. 2005-11316 also discloses technology that ends the allocation of real disk space which has not been used when the system administrator has issued a defragmentation start instruction.

However, in garbage collection (GC) technology of physical disk space which uses the journal log, it is judged whether the writing of the journal occurs, when the writing of the journal occurs, it is analyzed whether there is real disk space which can be liberated, and real disk space which can be liberated is liberated. Hence, when the erasure and updating of files with respect to a specified file system are a frequent occurrence, the function drops significantly in comparison with a system which does not run a thin provisioning function. This is because the processor managing the corresponding virtual disk volume performs the analysis of the journal log, the allocation of physical disk space, and the liberation of physical disk space, which are required for thin provisioning very frequently, in parallel with the normal data read processing and data write processing. In addition, in a situation where the erasure and the updating of the files are frequent, there is the risk that, following the GC of the storage disk space of the physical disks from a certain disk space of the virtual disk volume, the storage disk space of the physical disk will be immediately allocated to the same disk space, that the allocation of the storage disk space of a physical disk which is not required if not collected must be re-executed and that the processing efficiency relating to the I/O of the system will be wastefully reduced.

In addition, in cases where the allocation of real disk space which has not been used is liberated when the system administrator issues a defragmentation start instruction, there is the risk that GC processing will be executed even when the physical disk space which can be allocated is sufficient and that processing efficiency relating to the I/O of the system will be diminished. There is also the risk that, in cases where files are frequently erased and updated and so forth, as mentioned earlier, the storage disk space of the physical disk which is not required if not collected must then be allocated and the processing efficiency relating to the I/O of the system will be wastefully diminished.

SUMMARY OF THE INVENTION

Therefore, an object of the present invention is to provide technology which makes it possible to suitably prevent a reduction in the processing efficiency relating to the I/O of the computer system and to suitably collect physical disk space which has been allocated to a virtual volume.

In order to achieve the above object, the computer system according to a first aspect of the present invention is a computer system having a disk pool supply device which has a disk pool constituted by the physical disk space of one or more physical disks, a virtual volume management device which dynamically allocates the physical disk space belonging to the disk pool to the storage disk space of a virtual volume, a plurality of host computers which have a file system for managing files by using the storage disk space of the virtual volume, and a management computer for managing the host computers and the virtual volume management device, wherein the management computer comprises a threshold value storage unit which stores a predetermined threshold value which is used in a comparison with the free disk space amount of the disk pool; a free disk space amount acquisition unit which acquires the free disk space amount of the disk pool from the virtual volume management device; an invalid disk space amount acquisition unit which acquires, from the plurality of host computers, the amount of the invalid disk space in the virtual volume, which is disk space to which the physical disk space has been allocated but in which the files are not stored; a host determination unit which determines the host computer which instructs the GC of the physical disk space allocated to the invalid disk space on the basis of the amount of the invalid disk space; a physical free disk space amount judgment unit which judges whether the free disk space amount of the disk pool is smaller than the threshold value; and a GC request unit which transmits a GC request for the physical disk space allocated to the invalid disk space to the determined host computer after judging that the free disk space amount of the disk pool is smaller than the threshold value; the host computers each comprises an invalid disk space amount detection/transmission unit which detects the amount of the invalid disk space in the virtual volume and transmits the amount of invalid disk space to the management computer; and an invalid disk space position information transmission unit which, in cases where the GC request is received from the management computer, generates invalid disk space position information which indicates the position of invalid disk space in the virtual volume and transmits the invalid disk space position information to the virtual volume management device; and the virtual volume management device comprises a free disk space amount transmission unit which transmits the free disk space amount of the disk pool to the management computer; and a GC unit which receives the invalid disk space position information from the host computer and collects the physical disk space of the physical disk allocated to the storage disk space of the virtual volume on the basis of the invalid disk space position information.

BRIEF DESCRIPTION OF THE DRAWINGS

FIG. 2 shows an example of a GC setting table according to the first embodiment of the present invention;

FIG. 3 shows an example of a GC management table according to the first embodiment of the present invention;

FIG. 5 illustrates an FS map and an FS written map according to the first embodiment of the present invention;

FIG. 6 shows an example of a host management table according to the first embodiment of the present invention;

FIG. 7 shows an example of an FS management table according to the first embodiment of the present invention;

FIG. 30 shows an example of a GC setting table according to the third embodiment of the present invention;

FIG. 31 shows an example of a physical host management table according to the third embodiment of the present invention;

FIG. 32 shows an example of a virtual host management table according to the third embodiment of the present invention;

FIG. 33 is a flowchart showing GC management processing according to the third embodiment of the present invention;

FIG. 35 is a flowchart showing virtual host relocation processing according to the third embodiment of the present invention.

DESCRIPTION OF THE PREFERRED EMBODIMENTS

First Embodiment: Computer System

The first embodiment of the present invention will be described in detail hereinbelow.

Overall Constitution of the System

Figure 1:
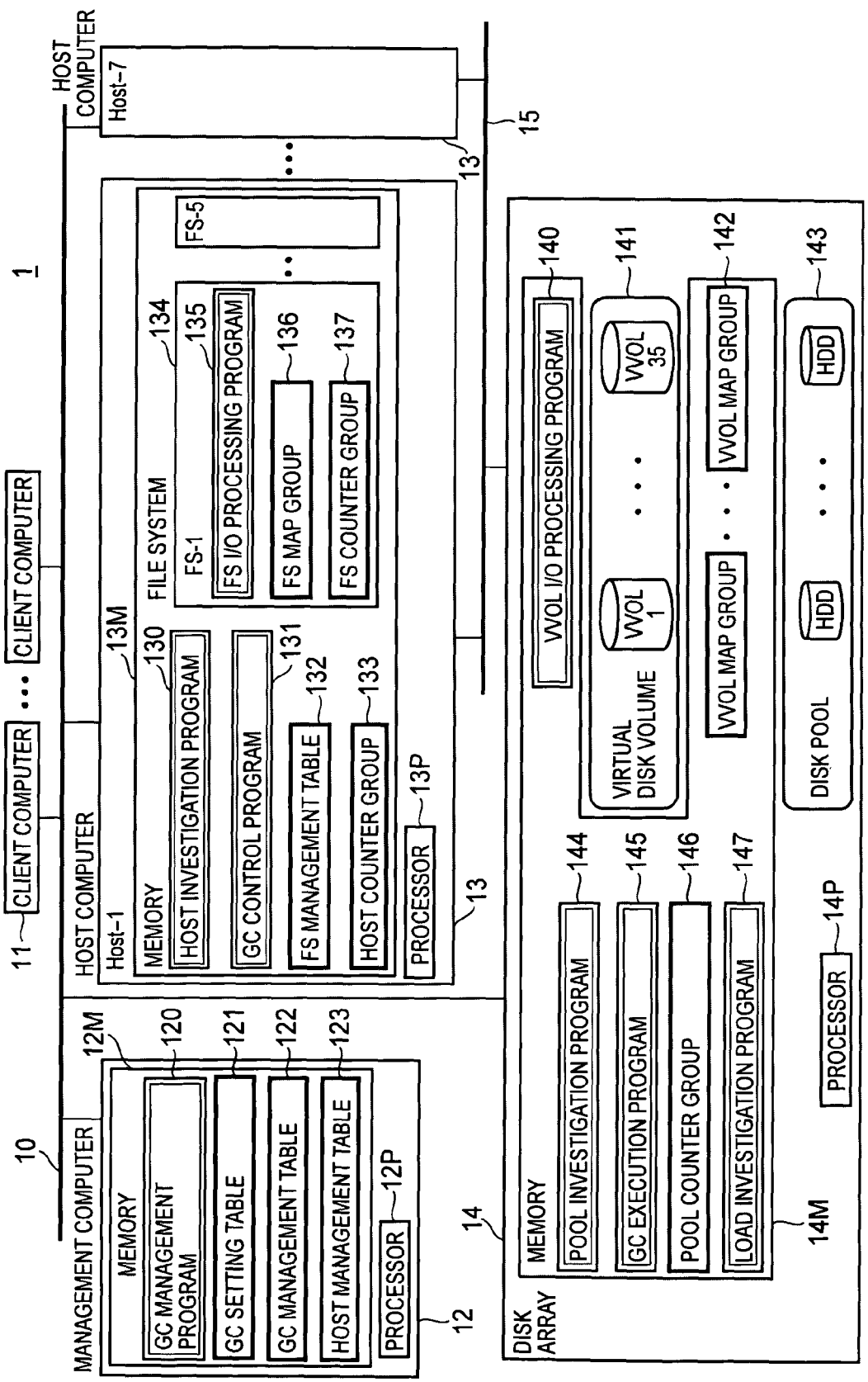
FIG. 1 is a block diagram showing the overall configuration of a computer system according to a first embodiment of the present invention.

FIG. 1 is a block diagram showing the overall configuration of a computer system according to a first embodiment of the present invention.

A computer system 1 is constituted by a client computer 11 used by a general user for utilizing services on various networks, a management computer 12, a host computer (host) 13 which provides the client computer 11 with services (Web server services and file sharing services, and so forth), a disk array 14 which is an example of a disk pool supply device and virtual volume management device which provides host computer 13 with a virtual disk volume 141 (virtual volume: VVOL), and networks 10 and 15 which connect the aforementioned parts. The network 10 may be a LAN (Local Area Network), the Internet, or a WAN (Wide Area Network). The communication protocol of the network 10 is generally IP (Internet Protocol). The network 15 is a SAN (Storage Area Network). The communication protocol of the network 15 is generally the FC (Fibre Channel) protocol but may also be IP (Internet Protocol) like network 10. For example, network 10 and network 15 can also be constituted by the same network.

Management Computer 12

The management computer 12 comprises a memory 12M which stores various programs and various tables or the like and a processor 12P which executes various processing in accordance with the programs in memory 12M.

The memory 12M is constituted by a RAM (Random Access Memory) and a ROM (Read Only Memory), for example, and stores a GC (garbage collection) management program 120 which manages the GC of physical disk storage space (physical disk space) of the physical disks and which is executed by the processor 12P, a GC setting table 121 which stores system settings relating to the GC of the physical disk space of the disks, a GC management table 122 which stores temporary information required for the GC of the physical disk space of the physical disks, and a host management table 123 which stores the load and the amount of invalid disk space of the host computer 13.

GC Setting Table 121

FIG. 2 shows an example of a GC setting table according to the first embodiment of the present invention.

The GC setting table 121 is a table for storing the settings of the disk collection processing. The GC setting table 121 is constituted by a investigation period field 1210, a GC start free disk space ratio field 1211, a GC end free disk space ratio field 1212, a minimum collected disk space ratio field 1213, a maximum CPU utilization field 1214, and a maximum standardized I/O load field 1215.

The investigation period field 1210 stores a time for judging whether to execute collection processing (investigation period: Tiv). The GC start free disk space ratio field 1211 stores the GC start free disk space ratio (Rstart) which is the proportion of the remaining disk amount with respect to the total capacity of the disk pool, which serves as a reference for starting collection processing. The GC end free disk space ratio field 1212 stores the GC end free disk space ratio (Rend) which is the proportion of the remaining disk amount with respect to the total capacity of the disk pool, which serves as a reference for ending collection processing. The minimum collected disk space ratio field 1213 stores the minimum collected disk space ratio (Rcllct-min) which is the proportion of the minimum disk amount collected by the collection processing with respect to the total capacity of the disk pool. The maximum CPU utilization field 1214 stores the maximum CPU utilization (maximum CPU utilization: Rcpu-max) which serves as a reference for the host computer 13 for the target to be collected. The maximum standardized I/O load field 1215 stores the maximum standardized I/O load (Rio-unit-max) which indicates the maximum value of the I/O load per unit size of the file system which is permitted for the GC target. The units of Rio-unit-max are obtained by dividing the IOPS (I/O per second) which is the unit of the I/O load by the bytes (B) representing the size.

For example, the example shown in FIG. 2 shows that the investigation period is 14:00, the GC start free disk space ratio is 20 percent, the GC end free disk space ratio is 30 percent, the minimum collected disk space ratio is 10 percent, the maximum CPU utilization is 80 percent, and the maximum standardized I/O load is 0.05 (K IOPS/GB).

GC Management Table 122

FIG. 3 shows an example of a GC management table according to the first embodiment of the present invention.

The GC management table 122 is a table for storing information for managing disk collection processing and is constituted by a field of the amount of total disk space on disk pool (1220), a field of the amount of free disk space on disk pool (1221), a field of the amount of GC start free disk space (1222), a field of the amount of GC end free disk space (1223), a field of the target amount of collected disk space (1224), and a field of the minimum amount of collected disk space (1225).

The field of the total amount of disk space on disk pool (1220) stores the total disk amount (Qall) of the disk pool. The field of the amount of free disk space (1221) stores the amount of free disk space (Qrest) which is the free disk space amount of the disk pool. The field of the amount of GC start free disk space (1222) stores the amount of the GC start free disk space (Qstart) which is the remaining disk amount of the disk pool which serves as a reference (threshold value) for starting the collection processing. The field of the amount of GC end free disk space (1223) stores the amount of GC end free disk space (Qend) which is the remaining disk amount of the disk pool which serves as a reference for ending the collection processing. The field of the target amount of collected disk space (1224) stores the target amount of collected disk space (Qcllct) which is the disk amount targeted for collection. The field of minimum amount of collected disk space(1225) stores the minimum amount of collected disk space (Qcllct-min) which is the disk amount constituting a minimum target for collection.

For example, the example shown in FIG. 3 shows that the amount of total disk space on disk pool is 3000 (GB), the amount of free disk space on disk pool is 500 (GB), the amount of GC start free disk space is 600 (GB), the amount of GC end free disk space is 900 (GB), the target amount of collected disk space is 400 (GB), and the minimum amount of collected disk space is 40 (GB).

Host Management Table 123

FIG. 6 shows an example of the host management table according to the first embodiment of the present invention.

The host management table 123 is a table for storing information such as the CPU utilization, FS number, an invalid disk space of the host computer 13. The host management table 123 can be broadly divided into a host ID field 12300, a host name field 12301, a state field 12302, an investigation result field 12303, a GC execution order field 12304, a GC result field 12305.

The host ID field 12300 stores the identification number (ID) of the host computer 13. The host name field 12301 stores the name of the host computer 13 (the host name). The state field 12302 stores information representing the state of the host computer 13.

The investigation result field 12303 is constituted by a CPU utilization field 12306, a total FS number field 12307, a total invalid disk space amount field 12308, a collection target FS number field 12309, and a GC target invalid disk space amount field 12310. The format of the investigation result field 12303 is the same as the return value format 12610 of the host investigation request (described subsequently).

The CPU utilization field 12306 stores the CPU utilization of the corresponding host computer 13. The total FS number field 12307 stores the number of FS (film systems) constituted by the corresponding host computer 13. The total invalid disk space amount field 12308 stores the total of the invalid disk space amount (the number of blocks, for example) of the corresponding host computer. The GC target FS number field 12309 stores the number of FS constituting the collection target. The collection target invalid disk space amount field 12310 stores the total of the collection target invalid disk space amounts.

The GC execution order field 12304 stores the order for collecting invalid disk space. The GC result field 12305 comprises a collected FS number field 12311, a collected invalid disk space amount field 12312, a collection measurement error field 12313, an uncollected FS number field 12314, an uncollected invalid disk space amount field 12315, a collection failure FS number field 12316, and a collection failure invalid disk space amount field 12317.

The collected FS number field 12311 stores the number of collected FS. The collected invalid disk space amount field 12312 stores the collected invalid disk space amount. The collection measurement error field 12313 stores the difference in the invalid disk space amount between the investigation result and the GC result. The uncollected FS number field 12314 stores the number of uncollected FS. The uncollected invalid disk space amount field 12315 stores the uncollected invalid disk space amount. The collection failure FS number field 12316 stores the number of FS for which collection failed. The collection failure invalid disk space amount field 12317 stores the invalid disk space amount for which collection failed.

Host Computer 13

The host computer 13 comprises a memory 13M which stores various programs and various tables or the like and a processor (CPU) 13P which executes various processing in accordance with the programs in memory 13M.

The memory 13M is constituted by a RAM and ROM, for example, and stores a host investigation program 130 which is executed by the processor 13P and which is for investigating the load and file system (FS) in the host computer 13, a GC control program 131 which is executed by the processor 13P and which serves to control the collection of physical disks upon receipt of a collection request from the management computer 12, an FS management table 132 which stores load information and so forth for managing the file system, a host counter group 133 which stores the states of the host computer, and the programs of the file system 134 or the like.

The file system 134 is constituted as a result of the processor 13P executing processing by using the FS I/O processing program 135 which executes I/O processing of the file system, an FS map group 136 which is management information for the file system, and an FS counter group 137 for measuring the I/O load and collection status of the file system.

Figure 4:
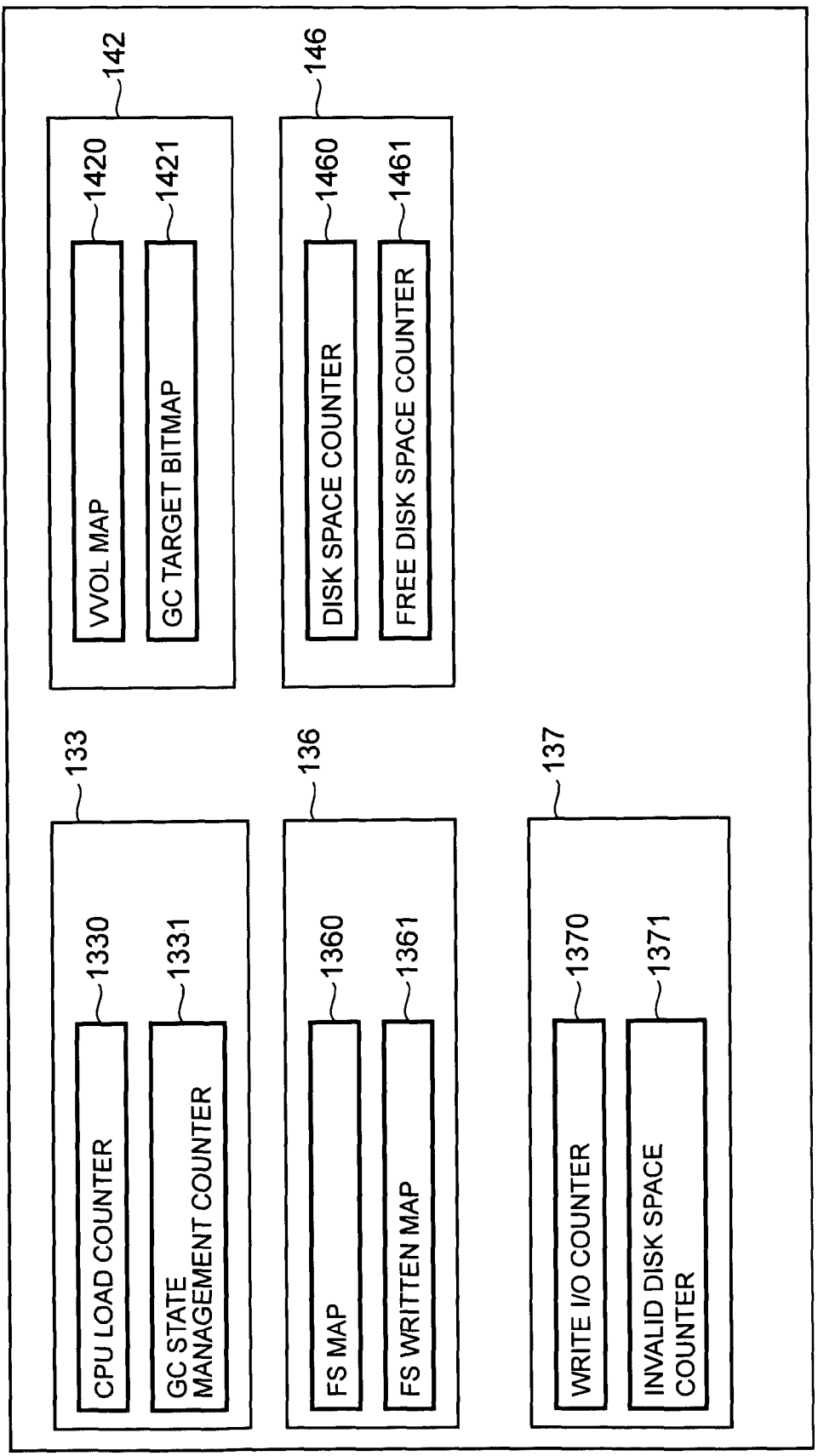
FIG. 4 is a block diagram which shows the configuration of bitmap and counter groups according to the first embodiment of the present invention.

FIG. 4 is a block diagram which shows the constitution of bitmap and counter groups according to the first embodiment of the present invention.

The host counter group 133 is constituted by a CPU load counter 1330 for measuring the CPU utilization of the host computer 13 and a collection state management counter 1331 for managing the states of collection of the physical disks.

The FS map group 136 is constituted by an FS map (file system map information) 1360 and an FS written map (written map information) 1361.

The FS map 1360 is a bitmap representing the positions (block positions) of the valid data in the file system. In this embodiment, a bitmap is constituted by arranging bits which correspond with each of data storage positions in the file system in a predetermined order and bits for which valid data are held are set to "1".

The FS written map 1361 is a bitmap which represents the position of data written once on the file system (block position). In this embodiment, a bitmap is constituted by arranging bits which correspond with each of data storage positions in the file system in a predetermined order and bits which correspond with positions in which data are written are set to "1".

It is possible to grasp whether a block is an unused block which is free physical disk space of a disk, a used block, or an invalid block according to the values of each of the bits corresponding with the same data position in the FS map 1360 and FS written map 1361. Here, an invalid block is a block to which data have previously been written by the file system but for which the data become invalid because the file data are subsequently erased. The block is in a state where physical disk space has been allocated even though the data are invalid.

FIG. 5 illustrates an FS map and an FS written map according to the first embodiment of the present invention.

For example, as shown in FIG. 5, in a case where bits which correspond with the same data position are "0" in FS map 1360 and "0" in FS written map 1361, it is shown that the block in the position corresponding with these bits is an unused block and, in a case where bits which correspond with the same data position are "1" in FS map 1360 and "1" in FS written map 1361, it is shown that the block is a used block. In a case where bits which correspond with the same data position are "0" in FS map 1360 and "1" in FS written map 1361, it is shown that the block is an invalid block.

Returning to the description of FIG. 4, the FS counter group 137 is constituted by a writing I/O counter 1370 for counting the write request count and an invalid disk space counter 1371 for counting the size (amount) of invalid disk space.

FS Management Table

FIG. 7 shows an example of an FS management table according to the first embodiment of the present invention.

The FS management table 132 is a table for storing the investigation results and GC results of the file system and is constituted by an FSID field 13200, an FS name field 13201, a corresponding VVOL field 13202, a size field 13203, a maximum I/O load field 13204, an investigation result I/O load field 13205, an investigation result invalid disk space size field 13206, a GC target field 13207 indicating the existence or non-existence of a GC target, a GC execution order field 13208, a GC result success field 13209, a failure field 13210, an avoidance field 13211, a GC completion actual results field 13212, and a measurement error field 13213.

The FSID field 13200 stores the identification number (ID) of the file system. The FS name field 13201 stores the FS name. The corresponding VVOL field 13202 stores the corresponding virtual volume name (VVOL name). The size field 13203 stores the size of the storage disk space of the VVOL. The maximum I/O load field 13204 stores the maximum I/O load which is the maximum value of the I/O load permitting the collection of invalid disk space of the file system. This value is obtained by multiplying the maximum standardized I/O load (Rio-unit-max) 1215 held in the GC setting table by the size of the file system. The investigation result I/O load field 13205 stores the I/O load of the corresponding FS. The investigation result invalid disk space size field 13206 stores the invalid disk space size of the corresponding FS. The GC target field 13207 stores information indicating the existence or non-existence of a GC target. The GC execution order field 13208 stores the order which serves as a reference when performing collection. The GC result success field 13209 stores information indicating whether collection has been successful. The failure field 13210 stores information indicating whether collection has failed. The avoidance field 13211 stores information indicating whether collection has been avoided. The GC completion actual results field 13212 stores the size of an invalid disk space for which collection has been completed. The measurement error field 13213 stores the measurement error between the invalid disk space size of the investigation result and the collected invalid disk space size.

Disk Array 14

The disk array 14 comprises a memory 14M which stores various programs and various tables or the like, a processor 14P which executes various processing in accordance with the programs in memory 14M, and a disk pool 143 which pools physical disk space constituted by one or more HDD (Hard Disk Drives: physical disks).

The memory 14M is constituted by a RAM and ROM, for example, and stores a VVOL I/O processing program 140 for allowing the processor 14P to execute processing to allocate physical disk space of the disk pool 143 to VVOL 141 dynamically in accordance with an I/O request from the host computer 13, a VVOL map group 142 which is a bitmap group representing the allocated state of the VVOL physical disk space, a pool investigation program 144 for executing processing to investigate the usage state of the physical disk space of the physical disks of the disk pool 143, a GC execution program 145 for executing the collection of physical disk space, a pool counter group 146 for managing the status of the physical disk space of the disk pool 143, and a load investigation program 147 for executing processing to investigate the load of the I/O processing processor 14P.

Although the disk array 14 provides a thin provisioning function in FIG. 1, the host computer 13 may also provide a thin provisioning function. In this case, all or some of the VVOL I/O processing program 140, VVOL map group 142, pool investigation program 144, GC execution program 145, and the pool counter group 146 are held in the host computer 13 and can be implemented as a result of being executed.

As shown in FIG. 4, the pool counter group 146 is constituted by a disk space counter 1460 which indicates the total size of the physical disk space in the disk pool 143 and a free disk space counter 1461 which indicates the total size of the free disk space in the disk pool 143.

As shown in FIG. 4, the VVOL map group 142 is constituted by a VVOL map 1420 which is a bitmap indicating the state of allocation of the physical disk space to the disk space on the corresponding VVOL (virtual disk space) and a GC target bitmap 1421 which indicates the disk space on the VVOL which is the GC target.

The processing executed by the management computer 12 will be described next.

GC Management Processing

Figure 12:
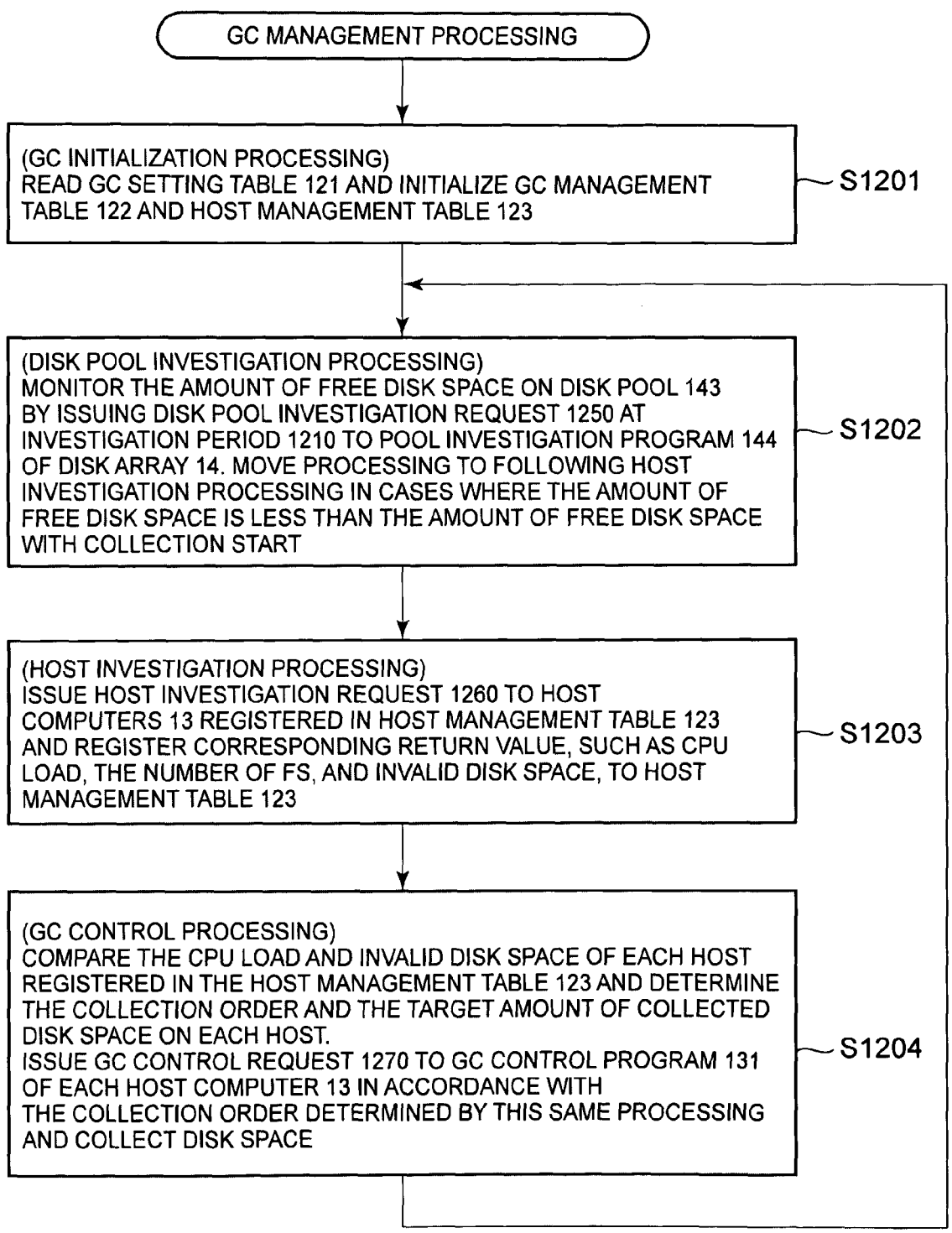
FIG. 12 is a flowchart showing GC management processing according to the first embodiment of the present invention.

FIG. 12 is a flowchart showing GC management processing according to the first embodiment of the present invention.

The GC management processing is executed as a result of the processor 12P in the management computer 12 executing the GC management program 120.

The processor 12P first executes program initialization processing to initialize a table related to GC management (step S1201). In the program initialization processing, the GC setting table 121 is read and the GC management table 122 and host management table 123 are initialized.

Thereafter, the processor 12P executes disk pool investigation processing which monitors the free disk space amount of the physical disk space of the disk pool (step S1202). In the disk pool investigation processing, the free disk space amount of the disk pool 143 is monitored by issuing a disk pool investigation request 1250 at regular intervals to the processor 14P which executes the pool investigation program 144 of the disk array 14.

Further, the processor 12P shifts the processing to the next host investigation processing (step S1203) in cases where the free disk space amount of the disk pool is smaller than the amount of GC start free disk space. As a result, the collection of the physical disk space of the disk pool 143 is started subsequently.

The processor 12P executes the host investigation processing which gathers information such as load information and the amount of invalid disk space of the host computer 13 (step S1203). In the host investigation processing, the processor 12P issues a host investigation request 1260 to the processor 13P which executes the host investigation program 130 of the host computer 13 registered in the host management table 123 and registers the CPU utilization, the total number of file systems, the total invalid disk space amount, the number of GC target file systems, and the GC target invalid disk space amount, which constitute return values, to the host management table 123. The processor 12P shifts the processing to the subsequent GC control processing (S1204) upon completion of an investigation of all the host computers registered in the host management table 123.

The processor 12P executes GC control processing which collects the physical disk space of the disk pool of the disk array 14 (step S1204). In the GC control processing, the processor 12P compares the investigation result of the respective host computers registered in the host management table 123 and determines the disk collection amount and GC execution order which are requested of each host computer. Thereafter, the processor 12P issues a GC control request 1270 to the processor 13P which executes the GC control program 131 of each host computer 13 in accordance with the determined GC execution order and collects the physical disk space. In cases where the collection conditions are satisfied or in cases where the invalid disk space of all of the target host computers 13 has been collected, the processor 12P returns the processing to the disk pool investigation processing (S1202).

The format of various requests which are issued to the host computer 13 and disk array 14 in the collection management processing will be described next.

Format of the Disk Pool Investigation Request 1250

Figure 8:
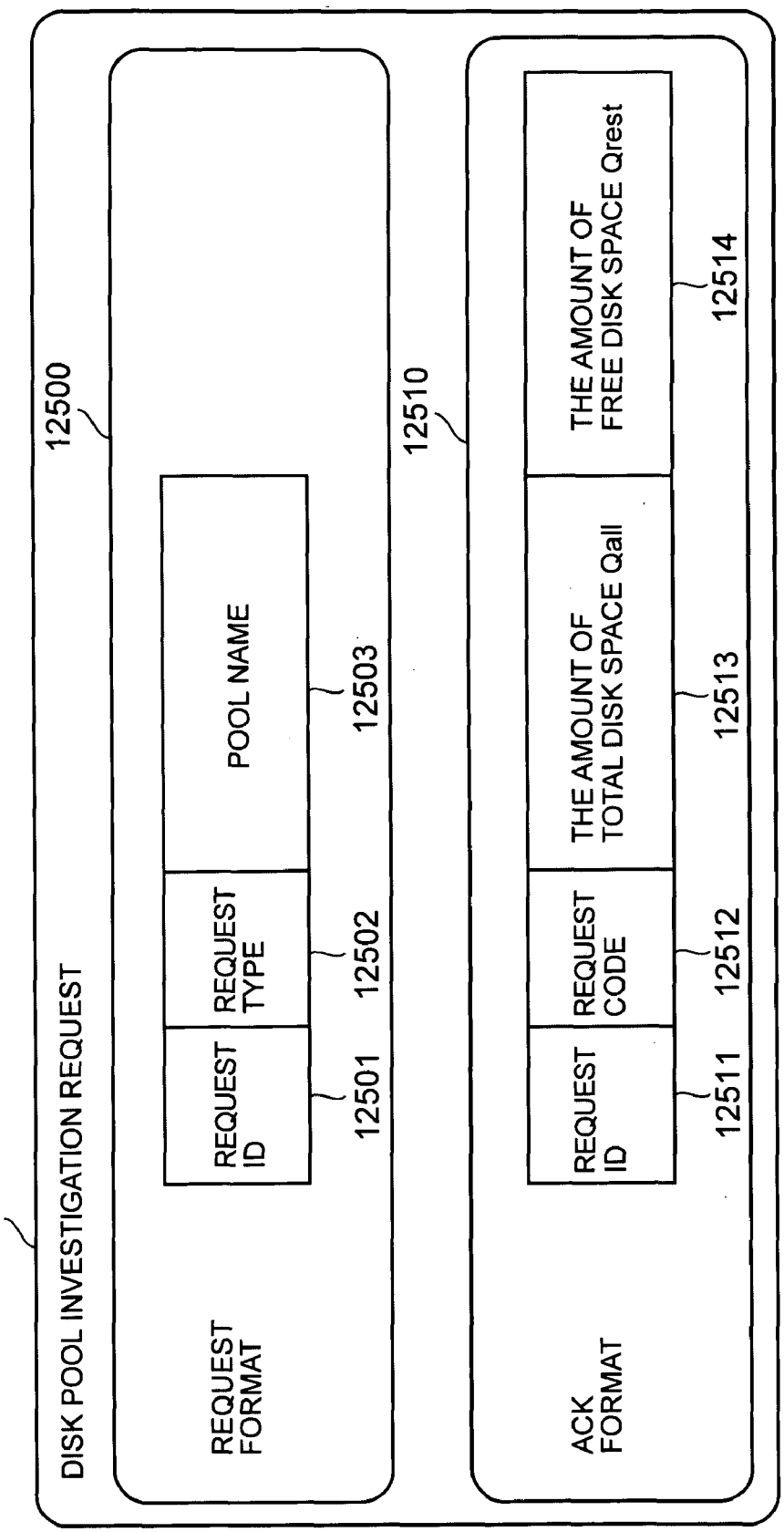
FIG. 8 shows an example of the formats of a disk pool investigation request according to the first embodiment of the present invention.

FIG. 8 shows an example of the format of a disk pool investigation request according to the first embodiment of the present invention.

The request data 12500 of the disk pool investigation request 1250 comprises a request ID field 12501 which stores the request ID for uniquely identifying the request, a request type field 12502 which stores the request type allowing the reception side to identify the request type, and a pool name field 12503 which stores a pool name which represents the name of the investigation target disk pool. The message format is used in this embodiment as the format of the request data 12500. However, a format where commands are transmitted by using RSH shell or the like is also possible. The same may also be said of the respective requests (described subsequently).

The ACK(acknowledge) 12510 comprises a request ID field 12511 which stores the request ID, a result code field 12512 which stores the result code representing the results to the request, a total disk amount field 12513 which stores the total disk amount Qall which indicates the total disk amount of the disk pool, and the free disk space amount 12514 which stores the free disk space amount Qrest which indicates the free disk space amount of the free disk space of the disk pool.

Through the use of the disk pool investigation request 1250, the processor 12P which executes the GC management investigation program 120 of the management computer 12 is able to obtain the amount of total disk space of the disk pool and the amount of free disk space of the designated disk pool from the processor 14P which executes the pool investigation program 144 of the disk array 14. The total disk amount and the free disk space amount of the disk pool thus obtained are each held in a field of the amount of the disk pool (1220) and a field of the amount of free disk space of disk pool (1221) of the GC management table 122.

Format of the Host Investigation Request 1260

Figure 9:
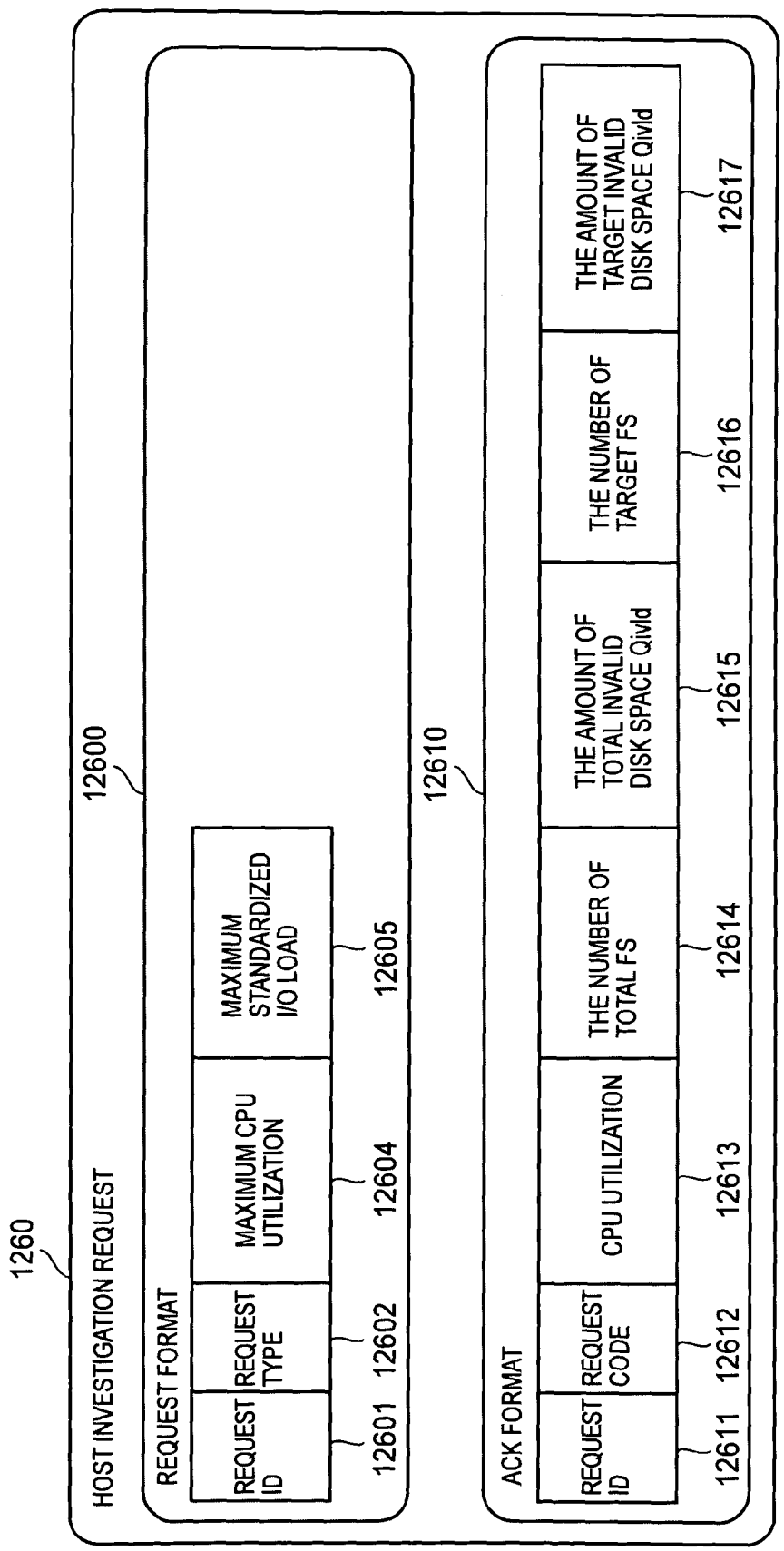
FIG. 9 shows an example of the formats of a host investigation request according to the first embodiment of the present invention.

FIG. 9 shows an example of the format of the host investigation request according to the first embodiment of the present invention.

The request data 12600 of the host investigation request 1260 comprises a request ID field 12601 which stores the request ID, a request type field 12602 which stores the request type, the maximum CPU utilization field 12604 which stores the maximum CPU utilization, and a maximum standardized I/O load field 12605 which stores the maximum standardized I/O load. The maximum CPU utilization is the maximum value of the CPU utilization which serves as a reference for the host computer 13 which constitutes a GC target in "normal" collection mode. In the "normal" collection mode, the processor 12P does not issue a collection request to a host computer with a higher CPU utilization than the maximum CPU utilization. The maximum standardized I/O load is the maximum value of the I/O load per unit capacity which serves as a reference for the host computer 13 which is the GC target in "normal" collection mode.

The return value data 12610 of the host investigation request 1260 comprises a request ID field 12611 which stores the request ID, a result code field 12612 which stores the result code, a CPU utilization field 12613 which stores the CPU utilization, a total FS number field 12614 which stores the total number of FS, a total invalid disk space amount 12615 which stores the total invalid disk space amount, a target FS number field 12616 which stores the number of FS targeted for GC (target FS number), and a target invalid disk space amount field 12617 which stores the target invalid disk space amount (target invalid disk space amount). Here, the target FS number and target invalid disk space amount are the number of FS targeted for physical disk space collection and the invalid disk space amount in "normal" GC mode. The data stored in the ACK 12610 are registered in the investigation result field 12303 (12306 to 12310) of the host management table 123 in order starting with the CPU utilization.

Format of GC Control Request 1270

Figure 10:
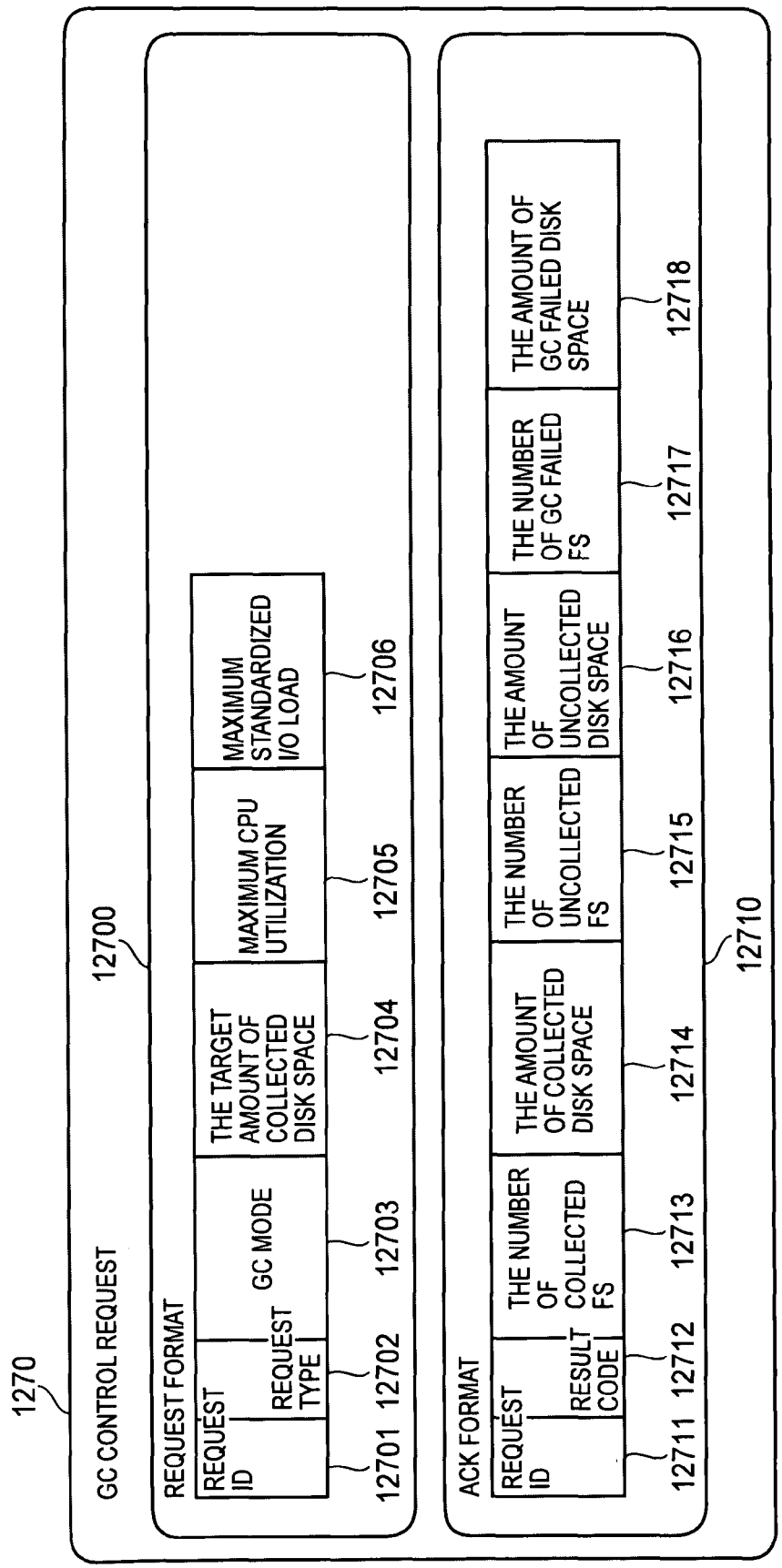
FIG. 10 shows an example of the formats of a GC control request according to the first embodiment of the present invention.

FIG. 10 shows an example of the format of the GC control request according to the first embodiment of the present invention.

The request data 12700 of the GC control request 1270 comprises a request ID field 12701 which stores the request ID, a request type field 12702 which stores the request type, a GC mode field 12703 which stores the GC mode, a required collected invalid disk space amount field 12704 which stores the required collected invalid disk space amount, a maximum CPU utilization field 12705 which stores the maximum CPU utilization, and a maximum standardized I/O load field 12706 which stores the maximum standardized I/O load. GC modes include normal mode and forced mode, where normal mode is a mode which collects physical disk space by targeting the file systems of host computers which satisfy a predetermined condition and forced mode is a mode which collects physical disk space irrespective of whether the file systems of the host computers satisfy a predetermined condition.

The return value data 12710 of the GC control request 1270 comprise a request ID field 12711 which stores the request ID, a result code field 12712 which stores the result code, a collected FS number field 12713 which stores the number of FS undergoing collection (number of collected FS), a collected invalid disk space amount field 12714 which stores the amount of collected disk space (the collected invalid disk space amount), an uncollected FS number field 12715 which stores the number of uncollected FS number, an uncollected invalid disk space amount field 12716 which stores the amount of uncollected invalid disk space, a GC failure FS number field 12717 which stores the number of FS for which collection failed, and a GC failure invalid disk space amount field 12718 which stores the amount of GC failure invalid disk space amount. The uncollected FS number and uncollected invalid disk space amount are the FS number and invalid disk space amount which are not collected when the GC condition for the host computer 13 is not satisfied in cases where the GC mode is "normal". The GC failure FS number and the GC failure invalid disk space amount are the FS number and invalid disk space amount for which GC has failed due to a power outage or fault.

Here, the value produced by adding together three invalid disk space amounts which (GC invalid disk space amount, uncollected invalid disk space amount, and GC failure invalid disk space amount) which appears in RCK data 12710 and the total invalid disk space amount of the return value data 12610 of the host investigation request 1260 are sometimes different values. This is because there is a time lag between the time the investigation is carried out and the time the GC is executed and the invalid disk space amount of the host computer 13 also varies naturally. The difference between these values when the investigation and GC are performed is registered in 12313 of the host management table 123 as the measurement error. The result of the ACK 12710 is registered in the corresponding fields 12311, 12312, 12314, 12315, 12316, and 12317 of the host management table 123 in order starting with the collected FS number.

Disk Pool Investigation Processing

Figure 13:
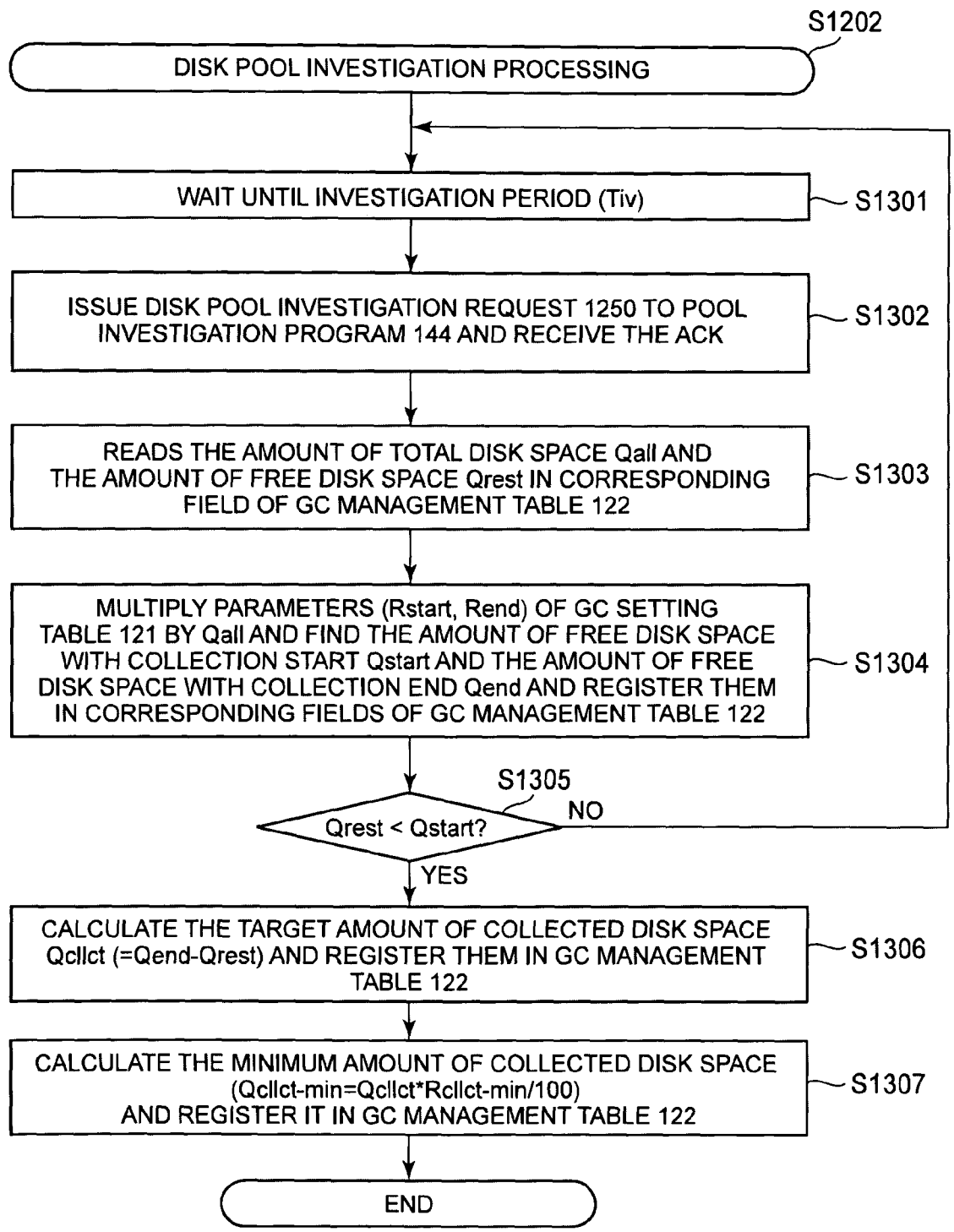
FIG. 13 is a flowchart showing disk pool investigation processing according to the first embodiment of the present invention.

FIG. 13 is a flowchart showing disk pool investigation processing according to the first embodiment of the present invention.

When processor 12P starts to execute the disk pool investigation processing, the processor 12P waits until the investigation period (Tiv) (step S1301). Thereafter, processor 12P issues a disk pool investigation request 1250 to the processor 14P which executes the pool investigation program 144 of the disk array 14 and receives the ACK 12510 (step S1302). Thereafter, processor 12P reads the amount of total disk amount Qall of the disk pool and the amount of free disk space Qrest of the disk pool in corresponding fields of the GC management table 122 (step S1303). Thereafter, processor 12P reads the GC start free disk space ratio Rstart and the GC end free disk space ratio Rend from the GC setting table 121 and multiply the amount of total disk space of disk pool (Qall) obtained in step S1303 by each of these parameters to calculate the amount of GC start free disk space (Qstart) and the amount of GC end free disk space (Qend), and registers same in the relevant fields of the GC management table 122 (step S1304). As shown in the specific examples of FIGS. 2 and 3, these calculations are Qstart=3000 GB (Qall)×20%(Rstart)/100=600 GB, Qend=3000 GB (Qall)×30%(Rend)/100=900 GB.

Thereafter, processor 12P compares the magnitudes of the amount of free disk space on disk pool (Qrest) and the amount of GC start free disk space (Qstart) and judges whether to run GC processing (step S1305). As a result, if Qrest is equal to or more than Qstart, processor 12P does not perform the GC processing and moves to step S1301. If, however, Qrest is less than Qstart, the processor 12P subtracts Qrest from Qend to calculate the target amount of collected disk space (Qcllct) and register same in the relevant fields of the GC management table 122 in order to perform GC processing (S1306). In the example of FIG. 3, Qcllct=Qend(900 GB)−Qrest(500 GB)=400 GB. Finally, processor 12P multiplies Qcllct by the minimum collected disk space ratio Rcllct-min and then calculates the minimum amount of collected disk space Qcllct-min by dividing same by 100, before registering Qcllct-min in the relevant field of the GC management table 122 and ending the processing (step S1307). In the examples of FIGS. 2 and 3, the minimum amount of collected disk space Qcllct-min=400 GB (the target amount of collected disk space Qcllct)*10 (minimum collected disk space ratio (%)Rcllct-min)/100=40 GB.

Host Investigation Processing

Figure 14:
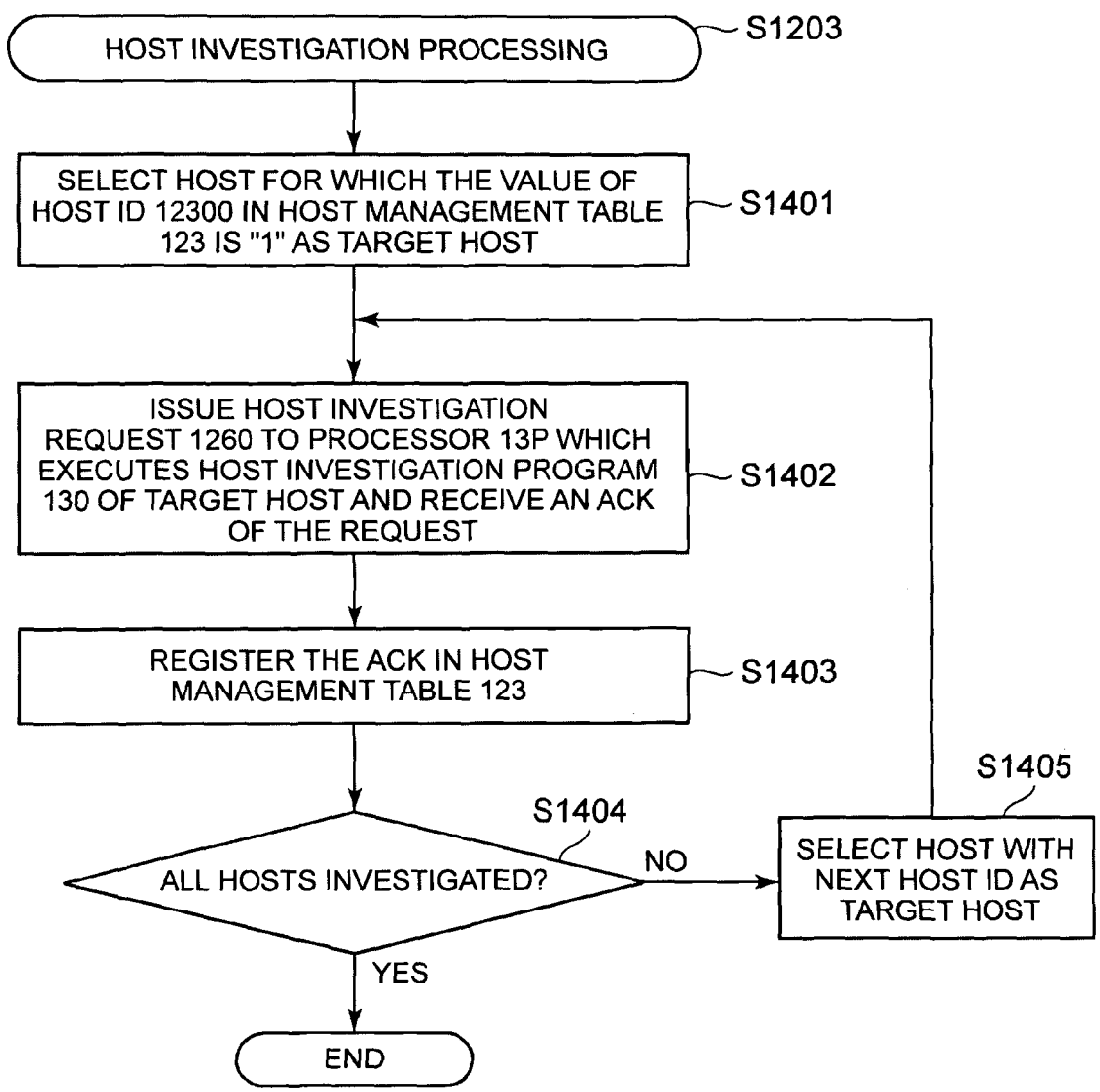
FIG. 14 is a flowchart showing the host investigation processing according to the first embodiment of the present invention.

FIG. 14 is a flowchart showing the host investigation processing according to the first embodiment of the present invention.

In the host investigation processing, processor 12P performs processing to check the CPU utilization, total FS number, total invalid disk space amount, GC target FS number, and the invalid disk space amount of the GC target of all the host computers registered in the host management table 123. In other words, processor 12P selects the host for which the host ID value in the host management table 123 is "1" as the target host (step S1401). Thereafter, the processor 12P issues a host investigation request 1260 to processor 13P which executes the host investigation program 130 of the target host and receives an ACK 12610 (step S1402). The processor 12P then registers the respective values of the ACK 12610 in the investigation result fields 12303 (12306, 12307, 12308, 12309, 12310) of the host management table 123 (step S1403). For example, as shown in FIG. 6, the result of the investigation of the host computer the host ID of which is "1" is that the CPU utilization is 72%, the total FS number is five, the total invalid disk space is 59 GB, the GC target FS number is five, the GC target invalid disk space is 59 GB.

Thereafter, processor 12P checks whether the host computers 13 registered in the host management table 123 have all been investigated (step S1404). As a result, in cases where all the host computers 13 have been investigated (step S1404: Yes), processor 12P ends the host investigation processing. However, in cases where all the host computers 13 have not been investigated (step S1404: No), processor 12P selects the host which is next in order, that is, the host of the next host ID as the target host (step S1405) and performs the steps S1402 to S1404 on the target host.

GC Control Processing

Figure 15:
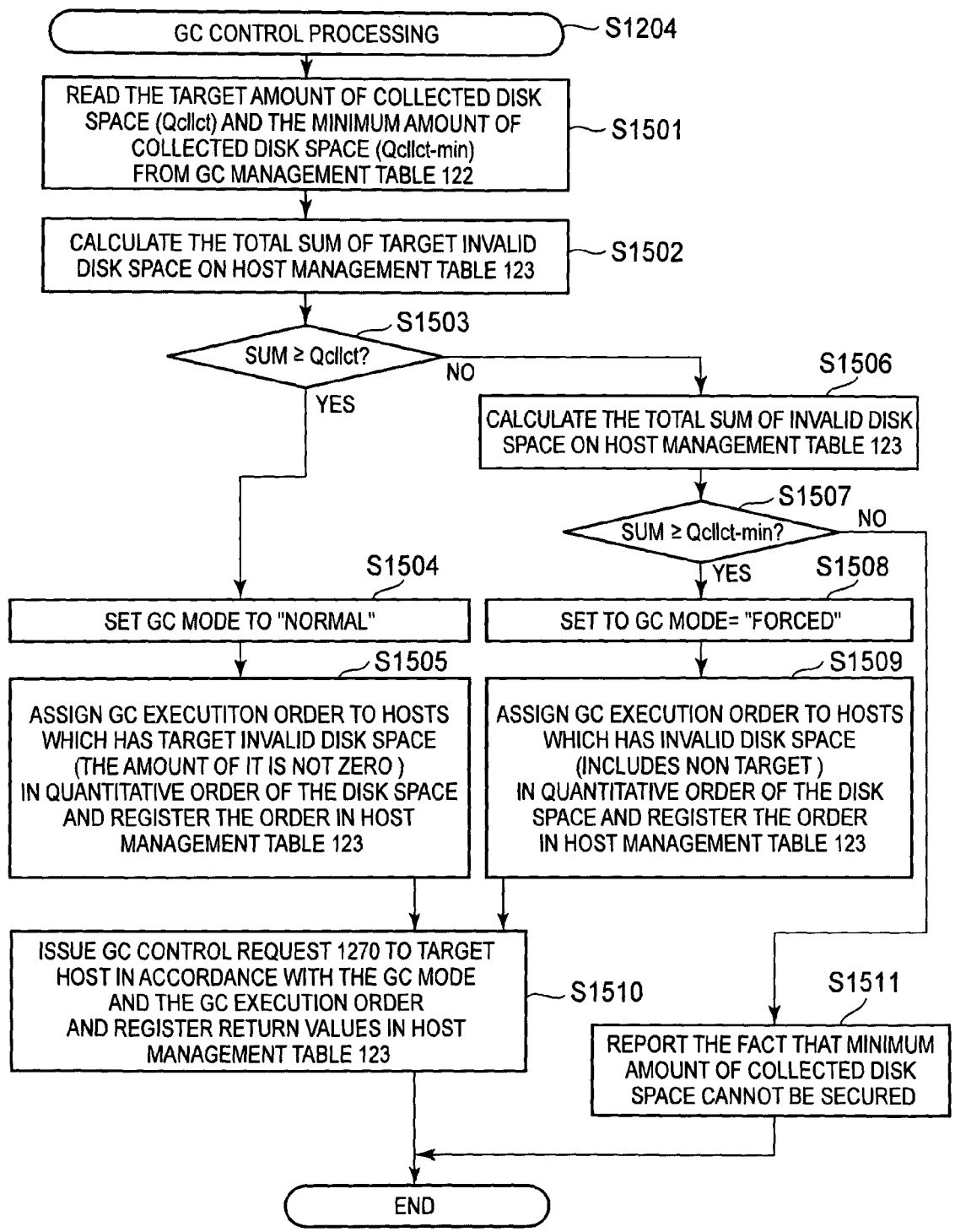
FIG. 15 is a flowchart showing GC control processing according to the first embodiment of the present invention.

FIG. 15 is a flowchart showing GC control processing according to the first embodiment of the present invention.

The GC control processing is processing which determines the GC mode from the investigation results of the disk array 14 and host computer 13 registered in the GC management table 122 and host management table 123 and issues the disk collection request 1270 to processor 13P which executes the GC control program 131 of the host computer 13 in order to execute the physical disk collection.

First, the processor 12P reads the target amount of collected disk space (Qcllct) and the minimum amount of collected disk space Qcllt-min from the GC management table 122 (step S1501). Thereafter, the processor 12P finds the sum of the target invalid disk space of the host management table 123 (step S1502) and evaluates whether the sum is equal to or more than the target amount of collected disk space Qcllct (step S1503).

As a result, in cases where the sum is equal to or more than the target amount of collected disk space Qcllct (step S1503: Yes), this signifies that it is possible to collect adequate physical disk space from the host computers and file systems which satisfy a predetermined condition. The processor 12P sets the GC mode to "normal" (step S1504) and assigns numbers to the GC target invalid disk space in the host computers whose GC target invalid disk space is greater than "0" starting with the GC target invalid disk space with the largest value, and registers the number assignment order in the GC execution order field 12304 of the host management table 123 (step S1505).

However, in cases where the sum is less than the target amount of collected disk space Qcllct (step S1503: No), processor 12P finds the sum of the total invalid disk space registered in the host management table 123 (step S1506) and evaluates whether the sum of the total invalid disk space is equal to or more than the minimum amount collected disk space Qcllct-min (step S1507). As a result, in cases where the sum of the total invalid disk space is equal to or more than the minimum amount of collected disk space Qcllct-min (step S1507:Yes), this signifies that the physical disk space which satisfies the minimum collection disk amount can be collected by all the host computers and file systems. Hence, processor 12P sets the GC mode to "forced" (step S1508), assigns numbers to the total invalid disk space in the host computers whose total invalid disk space is greater than "0" starting with the total invalid disk space with the largest value, and registers the number assignment order in the GC execution order field 12304 of the host management table 123 (step S1509). However, in cases where the sum of the total invalid disk space is less than the minimum amount of collected disk space Qcllct-min (step S1507: No), the processor 12P reports the fact that the minimum amount of collected disk space cannot be secured (step S1511) and ends the processing.

Finally, GC control request 1270 is issued to the host computer 13 in accordance with the GC mode and GC execution order determined in steps S1504 and S1505 or steps S1508 and S1509, the return value data 12710 is received and is registers in the host management table 123 (step S1510), and ends the processing.

The various processing executed by the host computer 13 will be described next.

Host Investigation Processing

Figure 16:
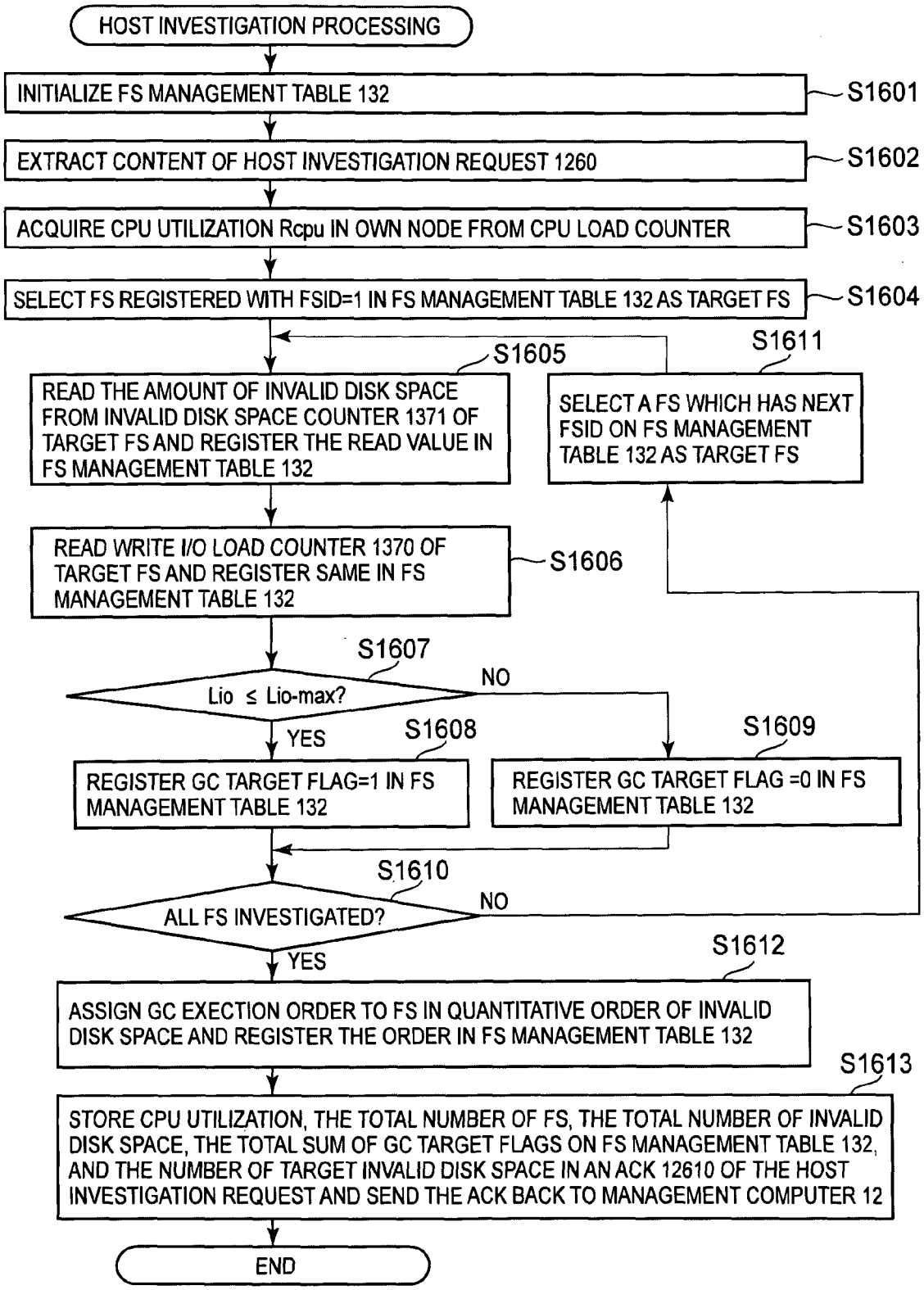
FIG. 16 is a flowchart showing host investigation processing according to the first embodiment of the present invention.

FIG. 16 is a flowchart showing host investigation processing according to the first embodiment of the present invention.

The host investigation processing is processing that is implemented as a result of the processor 13P executing the host investigation program 130. This constitutes processing to receive a host investigation request 1260 from the processor 12P which executes the GC management program 120 of the management computer 12, total the I/O loads and invalid disk space amounts of the respective file systems 134 in the host computers 13, and send back the total I/O load and total invalid disk space amount to the processor 12P which executes the GC management program 120.

Upon receipt of the host investigation request 1260 from the management computer 12, the processor 13P initializes the FS management table 132 (step S1601). In the initialization, the file system name, corresponding VVOL name, and size constituted on the host computer 13 are registered in the respective fields 13201, 13202, and 13203 of the FS management table 132. In addition, the processor 13P calculates the maximum I/O load (Lio-max) by multiplying the maximum standardized I/O load (Rio-unit-max) 1215 held in the GC setting table 121 by the size of the file system and registers the result in the maximum I/O load field 13204 of the FS management table 132.

Thereafter, processor 13P extracts the content of the request data 12600 of the host investigation request 1260 (step S1602) and investigates the CPU utilization Rcpu of its own node (step S1603). The processor 13P then selects the file system registered with FSID=1 in the FS management table 132 as the target (step S1604).

The processor 13P then reads the invalid disk space amount from the invalid disk space counter 1371 of the target file system and registers same in the FS management table 132 (step 1605) and reads the I/O load from the writing I/O load counter 1370 and registers same in the FS management table 132 (step S1606).

The processor 13P then evaluates whether the investigation I/O load Lio of the file system is equal to or less than the upper limit (maximum I/O load) Lio-max (step S1607). As a result, in cases where the I/O load Lio is equal to or less than the upper limit Lio-max, the processor 13P is able to grasp the fact that the possibility of the I/O processing being interrupted by the collection of the physical disk space of the file system is low and therefore registers "1", which indicates the existence of a GC target, in the GC target field 13207 of the FS management table 132 (step S1608). However, in cases where the I/O load Lio is greater than the upper limit Lio-max, the processor 13P is able to grasp the fact that the possibility of the I/O processing being interrupted by the collection of the physical disk space of the file system is then high and registers "0", which indicates the non-existence of a GC target in the GC target field 13207 of the FS management table 132 (step S1609).

Thereafter, the processor 13P judges whether this series of steps (steps S1605 to S1609) have been performed on all of the file systems (step S1610). In cases where this series of steps have not been performed on all of the file systems, the processor 13P performs the processing from step S1605 by taking the next file system in the FS management table 132, that is, the file system with the next FSID as the target file system (step S1611).

Further, in cases where an investigation of all of the file systems has ended (step S1610: Yes), the processor 13P assigns a GC execution order in order starting from the file system with the largest invalid disk space size and registers the GC execution order in the GC execution order field 13208 of the FS management table 132 (step S1612). Finally, the processor 13P stores the CPU utilization, total FS number, total invalid disk space, target FS number, and target invalid disk space in the return value data 12610 of the host investigation request 1260 and returns the result to the management computer 12 (step S1613) before ending the processing.

GC Control Processing

Figure 17:
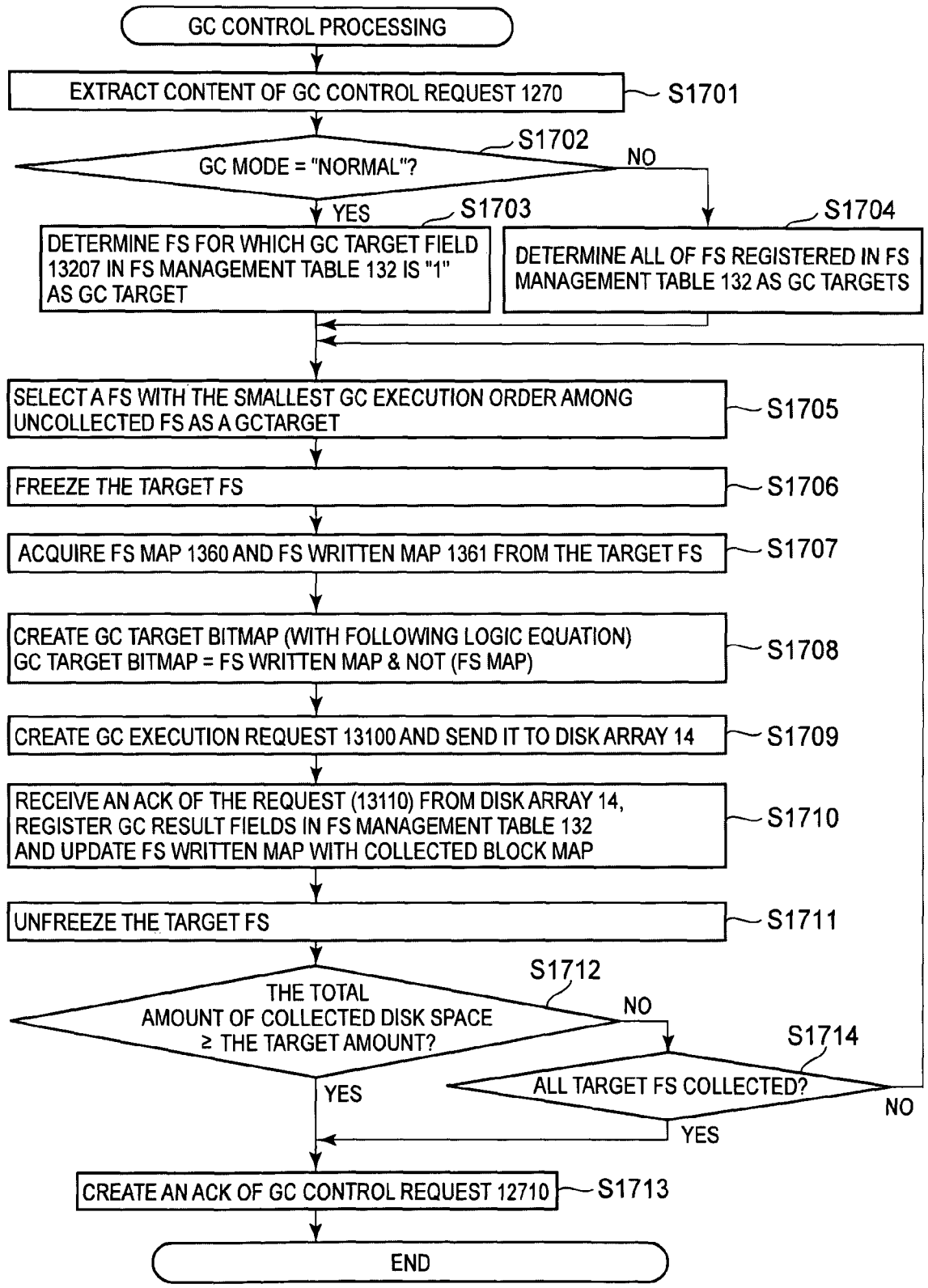
FIG. 17 is a flowchart showing GC control processing according to the first embodiment of the present invention.

FIG. 17 is a flowchart showing GC control processing according to the first embodiment of the present invention.

The GC control processing is implemented as a result of the processor 13P executing the GC control program 131 and is processing to create a bitmap which represents the distribution of the invalid disk space and transmit an GC control request to the processor 14P which executes the GC execution program 145 of the disk array 14.

In the GC control processing, the processor 13P acquires the content of the request data 12700 of the GC control request 1270 received from the management computer 12 (step S1701) and evaluates whether the GC mode is "normal" (step S1702). In cases where the result of the evaluation is that the GC mode is "normal" (step S1702: Yes), the processor 13P determines the file system for which the GC target field 13207 in the FS management table 132 is "1" as the GC target (step S1703). However, in cases where the GC mode is not "normal" (step S1702: No), the processor 13P determines all the file systems registered in the FS management table 132 as the GC target (step S1704).

Thereafter, the processor 13P selects the file system with the smallest GC execution order among the GC targets which have not undergone collection processing as the next processing target file system (step S1705) and freezes the selected target file system (step S1706). Here, to freeze the selected target file system means to mirror the data stored in the memory of the host computer 13 temporarily before the file system is mirrored in the disk array 14 in the disk array 14 in order to establish a state where I/O are not received.

Thereafter, the processor 13P acquires the FS map 1360 and FS written map 1361 of the target file system (step S1707) and creates a bitmap representing the invalid disk space which is the GC target of the file system from the two acquired maps (GC target bitmap: invalid disk space position information) (step S1708). Here, the GC target bitmap can be created by taking the logical and (AND) of the FS written map 1361 and the inverse of the FS map 1360 (NOT (FS map 1360)).

Thereafter, the processor 13P creates the request data 13100 (See FIG. 11) of the GC execution request 1310 and transmits the request data 13100 to the disk array 14 (step S1709). The processor 13P then receives an ACK 13110, registers the content in the FS management table 132, mirrors the results collected in the FS written map 1361 on the basis of the collected block map 13115 of the return value data 13110 (step S1710), and then unfreezes the file system (step S1711). Here, data which is mirrored in the FS written map 1361 can be obtained by taking the logical and (AND) of the FS written map 1361 and the inverse of the collected block map 13115 (NOT (collected block map 13115)).

Thereafter, the processor 13P evaluates whether the total amount of the collected disk space thus far is equal to or more than the target amount (step S1712). As a result, in cases where it is evaluated that the total amount is equal to or more than the target amount (step S1712: Yes), the processor 13P creates an ACK 12710 of the GC control request 1270 and transmits the ACK 12710 to the management computer 12 (step S1713) before ending the processing.

However, in cases where the total amount of collected disk space is less than the request collection amount (step S1712: No), the processor 13P evaluates whether the physical disk space collection from all of the target file systems has been performed (step S1714) and, in cases where collection has indeed been performed from all of the target file systems, the processing is ended. However, in cases where collection has not been performed from all of the target file systems, the same steps (steps S1705 to S1712) are executed with respect to the next file system.

Next, the format of the request which the host computer 13 uses in communications with the disk array 14 in the GC control processing will be described.

Format of the GC Execution Request 1310

Figure 11:
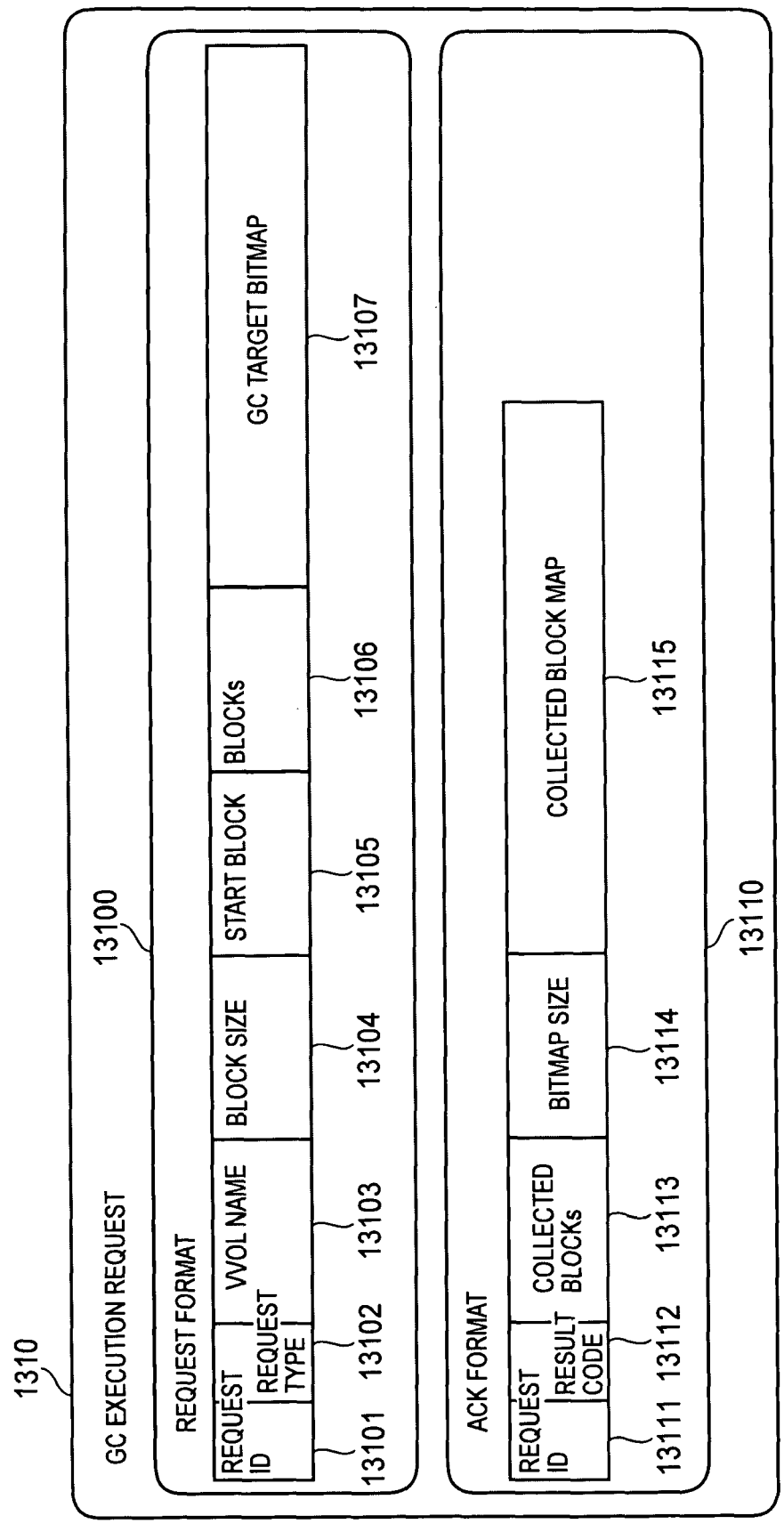
FIG. 11 shows an example of the formats of a GC execution request according to the first embodiment of the present invention.

FIG. 11 shows an example of the format of a GC execution request according to the first embodiment of the present invention.

The request data 13100 of the GC execution request 1310 comprises a request ID field 13101 which stores the request ID, a request type field 13102 which stores the request type, a VVOL name field 13103 which stores the VVOL name, a block size field 13104 which stores the collection unit block size, a start block field 13105 which stores the collection start block, blocks field 13106 which stores the number of collection target blocks, and a GC target bitmap field 13107 which stores a GC target bitmap. The collection unit block size means the data size of the block to collect. In cases where the data size of the collection unit block is prescribed beforehand, for example, there is no need to store the collection unit block size in the block size field 13104. The collection start block means the block number of the leading block of the corresponding GC target bitmap. The GC target block number means the number of blocks constituting the GC target which follow the collection start block which are contained in the corresponding GC target bitmap.

In cases where the block data size is fixed and the GC target bitmap is the bitmap from the leading block of the VVOL, there is no need to provide the block size field 13104, the start block field 13105, or the blocks field 13106 or to store values therein even when these fields are provided.

The ACK 13110 comprise a request ID field 13111 which stores the request ID, a result code field 13112 which stores the result code, a collected blocks field 13113 which stores the collected data size, a bitmap size field 13114 which stores the size of the bitmap of the blocks for which collection is accepted, and a collected block map field 13115 which stores the collected block map (collection acceptance map).

FILE I/O Processing (Write/Create)

Figure 18:
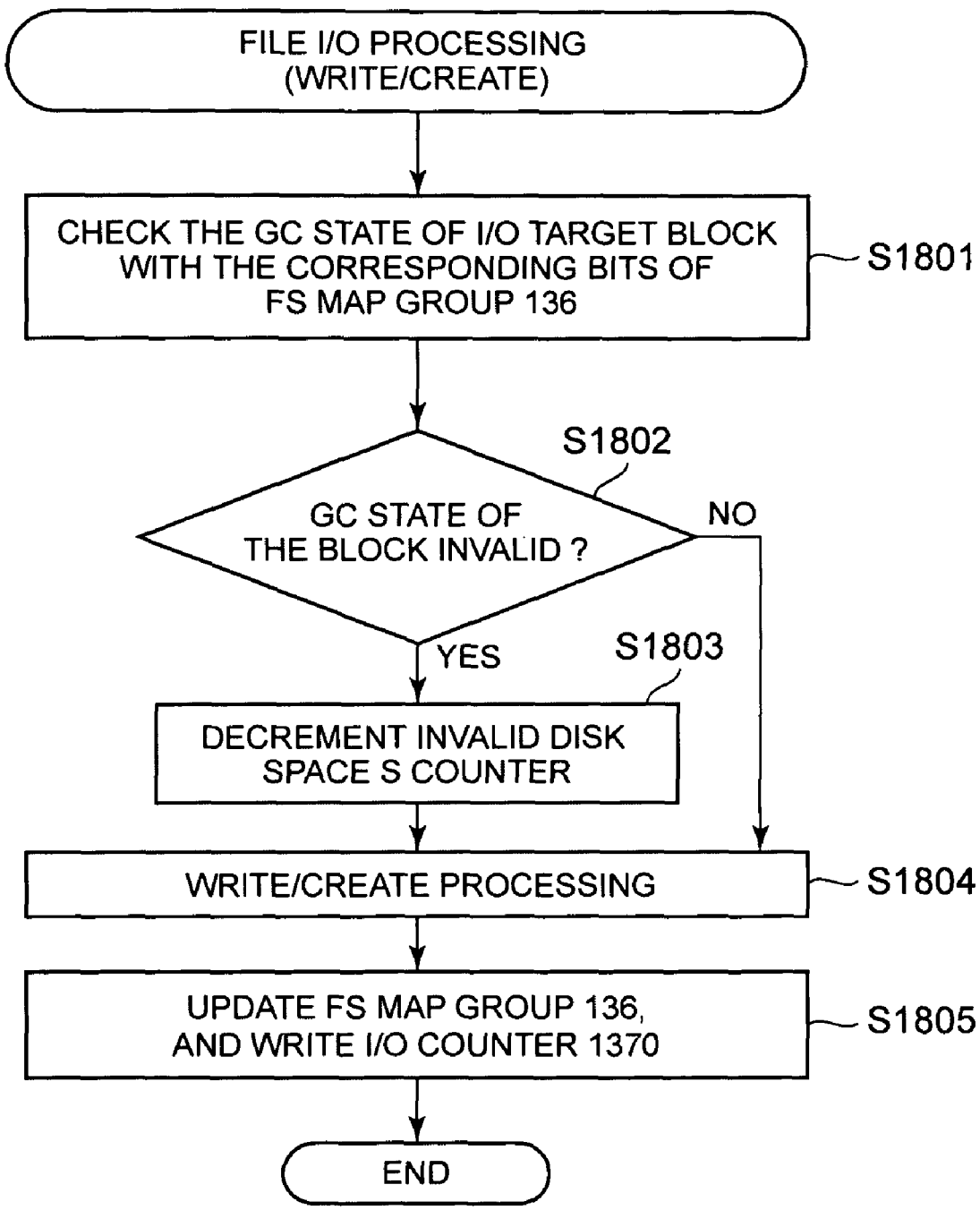
FIG. 18 is a flowchart showing file I/O processing at the time of a Write/Create request according to the first embodiment of the present invention.

FIG. 18 is a flowchart showing file I/O processing at the time of a write/create request according to the first embodiment of the present invention.

The file I/O processing at the time of a write/create request is executed when receiving a write/create request for the file system from the client computer 11. Upon receipt of the write/create request, the processor 13 preferences the bits which correspond to updated target blocks of the FS map 1360 and FS written map 1361 and checks the states of the update target block (step S1801).

Thereafter, the processor 13P evaluates whether the GC state of the updated target block is an invalid (step S1802). As a result, in cases where it is evaluated that the GC state of the target block is an invalid (step S1802: Yes), writing is performed with respect to the invalid block and the block then becomes a used block. Hence, the processor 13P decrements the invalid disk space counter 1371 (step S1803) and executes write/create processing (step S1804). Here, write/create processing signifies processing to store data contained in the write/create request in the disk array 14 by designating an allocated VVOL block in the file system.

However, in cases where it is evaluated that the GC state of the target block is not an invalid (step S1802: No), the act of decrementing the counter is skipped and write/create processing is executed (step S1804). Thereafter, the processor 13P updates the bits which correspond with the update target block of the FS map 1360 and FS written map 1361 to "1", increments the writing I/O counter 1370, and ends the processing.

As a result of this processing, the number of write/create requests is held in the writing I/O counter 1370 and the write/create I/O load at a predetermined time can be grasped by checking the counter at predetermined time intervals.

Figure 19:
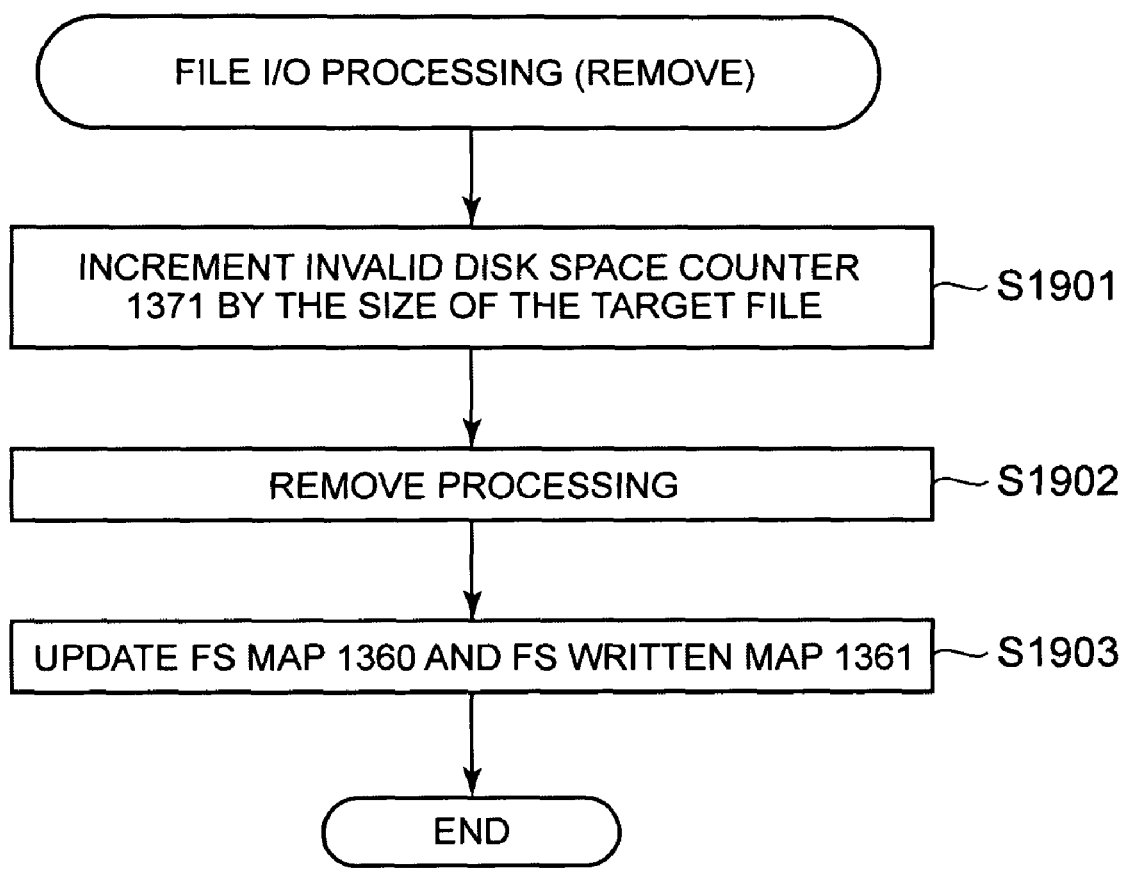
FIG. 19 is a flowchart showing file I/O processing at the time of a Remove request according to the first embodiment of the present invention.

FIG. 19 is a flowchart showing file I/O processing at the time of a Remove request according to the first embodiment of the present invention.

file I/O processing (remove) is executed upon receipt of a Remove request for a file in the file system from the client computer 11. Upon receipt of the Remove request, the processor 13P first increments the invalid disk space counter 1371 by the size (number of blocks) of the remove target file. This is because, in the event of a Remove operation, a block becomes invalid disk space and the invalid disk space increases. Thereafter, the processor 13P performs Remove processing (step 1902), updates the bits corresponding with the removed block in the FS map 1360 to "0" (step S1903), and ends the processing.

As a result of this processing, the invalid disk space size is suitably counted by the invalid disk space counter 1371.

Various processing which is executed by the disk array 14 will be described next.

Pool Investigation Processing

Figure 20:
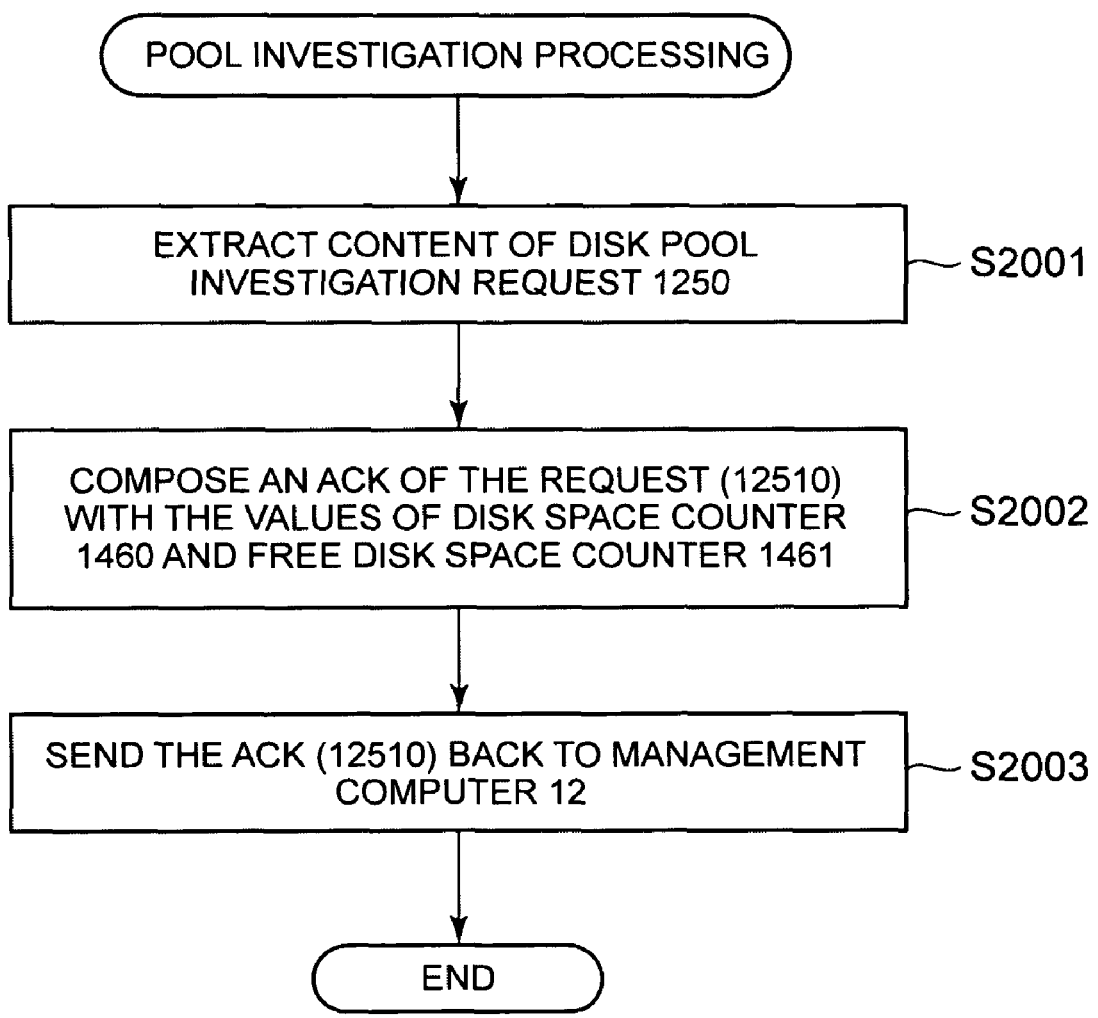
FIG. 20 is a flowchart showing pool investigation processing according to the first embodiment of the present invention.

FIG. 20 is a flowchart showing pool investigation processing according to the first embodiment of the present invention.

Pool investigation processing is implemented as a result of processor 14P executing the pool investigation program 144.

When the disk array 14 receives the disk pool free disk space investigation request 1250 from the management computer 12, the processor 14P extracts the content of the disk pool free disk space investigation request 1250 (step S2001) and composes an ACK 12510 with the values of the disk space counter 1460 and the free disk space counter 1461 of the disk pool 143 which is the investigation target (step S2002), sends back the ACK 12510 to the management computer 12 (step S2003), and ends the processing.

As a result of this processing, the disk space amount (total disk amount) and free disk space (free disk space amount) of the disk pool 143 can be sent back rapidly to the management computer 12.

GC Execution Processing

Figure 21:
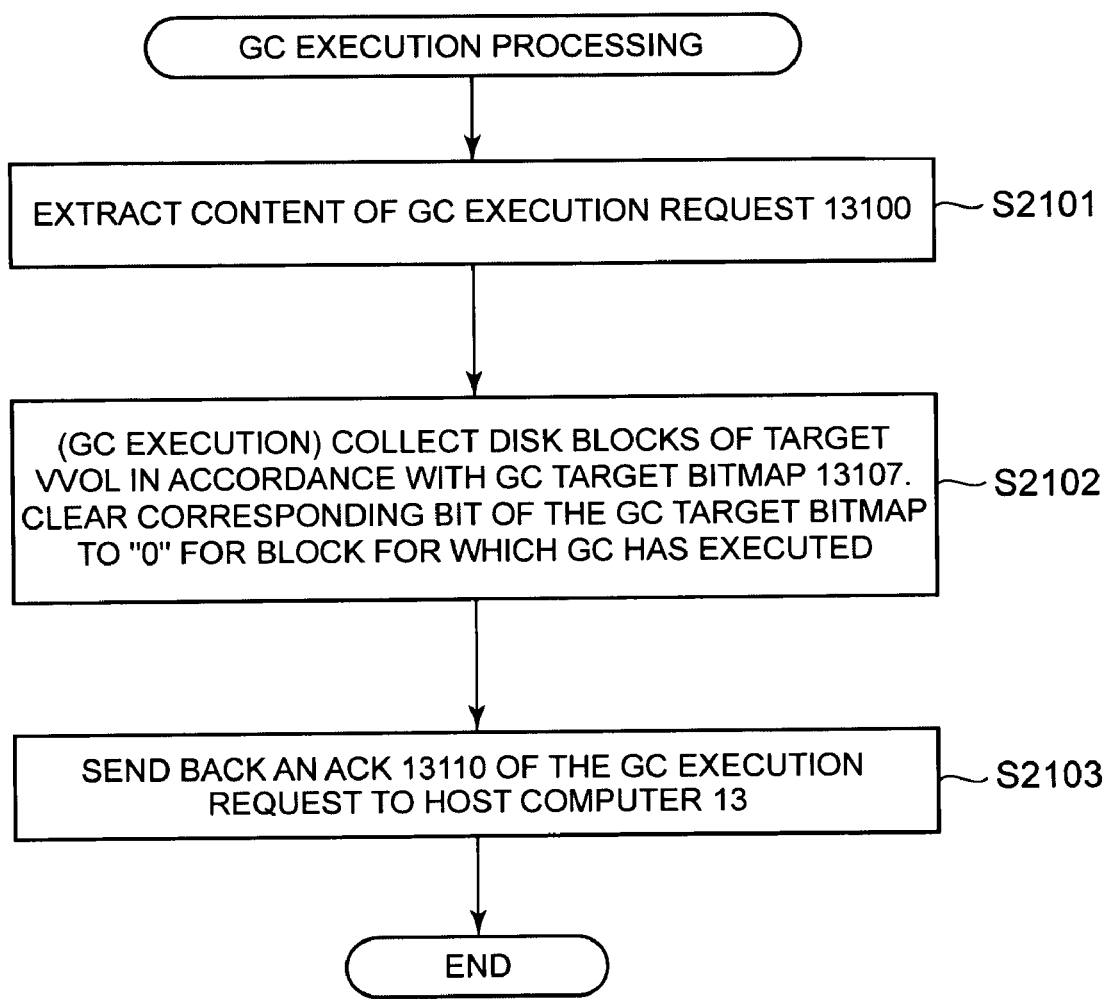
FIG. 21 is a flowchart showing GC execution processing according to the first embodiment of the present invention.

FIG. 21 is a flowchart showing the GC execution processing according to the first embodiment of the present invention.

The GC execution processing is implemented as a result of the processor 14P executing the GC execution program 145.

When the disk array 14 receives the GC execution request 13100 from the host computer 13, the processor 14P extracts the content of the GC execution request 13100 (step S2101) and executes the collection of the disk space. Here, the GC target block can be specified by the GC target bitmap held in the request data 13100 of the GC execution request 1310. In other words, all of the blocks which correspond with the bits showing a "1" in the GC target bitmap are the GC target. Here, the disk array 14 manages data representing the relationship between the respective blocks of the virtual volume and the physical disk space of the physical disk allocated to the blocks and the physical disk space of the physical disk can be collected by cancelling the relationship between the GC target blocks and the allocated physical disk space of the physical disk in these data. In other words, the data can be subsequently utilized in the event of a new allocation.

Thereafter, with respect to blocks for which collection has been completed, the processor 14P clears the bits which correspond with the blocks of the GC target bitmap to "0" and establishes "1" for those bits corresponding with the collected block map which has bits corresponding with the respective blocks (step S2102). The processor 14P then stores the collected block map in the ACK 13110 of the GC execution request, sends back ACK to the host computer 13 and ends the processing.

VVOL I/O Processing

Figure 22:
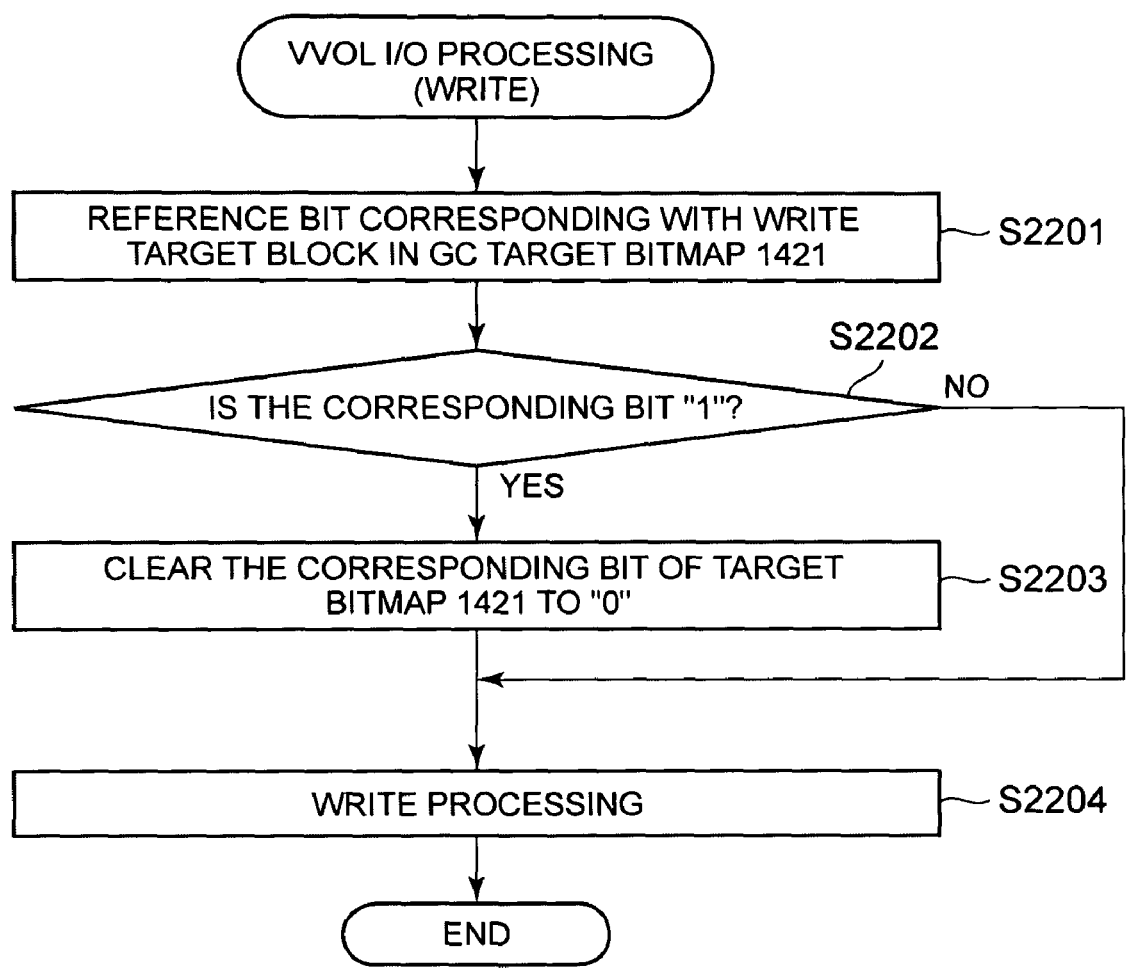
FIG. 22 is a flowchart showing VVOL I/O processing according to the first embodiment of the present invention.

FIG. 22 is a flowchart showing VVOL I/O processing according to the first embodiment of the present invention.

FIG. 22 is a flowchart for a case where the write processing of the VVOL I/O processing takes place while the GC execution processing is still being executed.

The VVOL I/O processing is implemented as a result of the processor 14P executing the VVOL I/O processing program 140.

When the disk array 14 receives a write request with respect to the VVOL from the host computer 13 when the GC execution processing is being executed, the processor 14P references the bit corresponding to the write target block in the GC target bitmap (step S2201) and evaluates whether the bit is "1" (step S2202). As a result, in cases where it is evaluated that the bit is "1" (step S2202: Yes), the processor 14P clears the bit in the GC target bitmap to "0", executes write processing (step S2204), and ends the processing.

However, in cases where it is evaluated that the bit is "0" (step S2202: No), the processor 14P executes write processing (step S2204) without performing the operation of the relevant bit, and ends the processing.

As a result of this processing, in cases where writing is performed with respect to blocks which are the GC target, the GC target bitmap is "0" and, therefore, cannot be collected in the GC execution processing. Therefore, write processing can be executed in parallel with the GC processing and a drop in the processing efficiency can be prevented.

With the computer system of the above embodiment, in cases where there it is thought that there is a great need to increase the free disk space amount of the disk pool such as when the free disk space amount of the disk pool of the disk array 14 is less than a threshold value, the physical disk space of the invalid disk space can be rapidly collected.

Second Embodiment

The computer system according to the second embodiment of the present invention will be described next.

The computer system according to the second embodiment is the computer system according to the first embodiment, wherein a snapshot function is added to the disk array 14. The description will focus on the differences from the first embodiment.

Overall System Constitution

Figure 23:
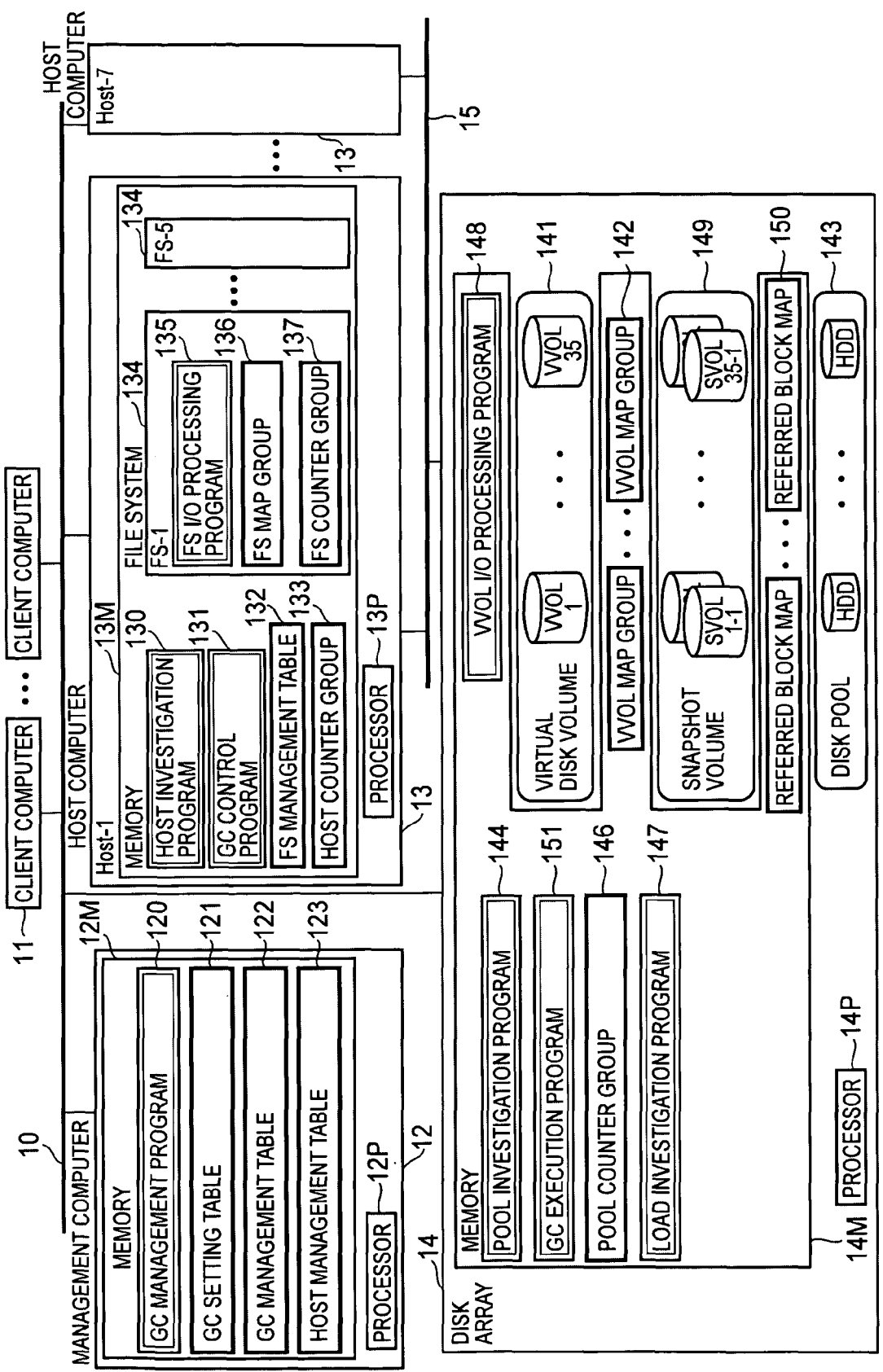
FIG. 23 is a block diagram showing the overall configuration of a computer system according to a second embodiment of the present invention.

FIG. 23 is a block diagram showing the overall configuration of the computer system according to the second embodiment of the present invention. In FIG. 23, the same reference numerals have been added to the same elements as the computer system according to the first embodiment.

The computer system according to the second embodiment differs from the computer system according to the first embodiment in that a constitution for implementing a snapshot function has been added to the disk array 14. The constituent elements other than the disk array 14, such as the client computer 11, management computer 12, host computer 13, networks 10 and 15 are the same as those of the first embodiment in terms of their constitution and operation, for example.

Although the disk array 14 provides the thin provisioning function in FIG. 23, the host computer 13 may also provide the thin provisioning function. In this case, all or some of the VVOL I/O processing program 148, VVOL map group 142, pool investigation program 144, GC execution program 151, pool counter group 146 are held in the host computer 13 and can be implemented as a result of being executed.

Disk Array 14

In addition to the constituent elements of the first embodiment, the disk array 14 according to the second embodiment comprises a virtual volume (SVOL) 149 which provides the snapshot of the VVOL and a referred block map (referenced map information) 150 which indicates the block number referenced from the SVOL in the physical disk space (real data block) allocated to the VVOL. In addition, the VVOL I/O processing program 148 and GC execution program 151 allow the processor 14P to also execute processing for maintaining the SVOL with respect to the VVOL I/O processing program 140 and GC execution program 145 of the first embodiment. The processor 14P will be described in terms of its operation for execution in accordance with the VVOL I/O processing program 148 and GC execution program 151.

The disk array 14 according to the second embodiment uses, as a snapshot function, a COW (Copy On Write) system which is a representative snapshot system, that is, a system for writing new data after saving old data in a separate dedicated disk volume. The system for the snapshot function of the disk array 14 is not limited to a COW system. It is also possible to apply a system which writes new data to new disk space without saving the old data, for example.

Figure 24:
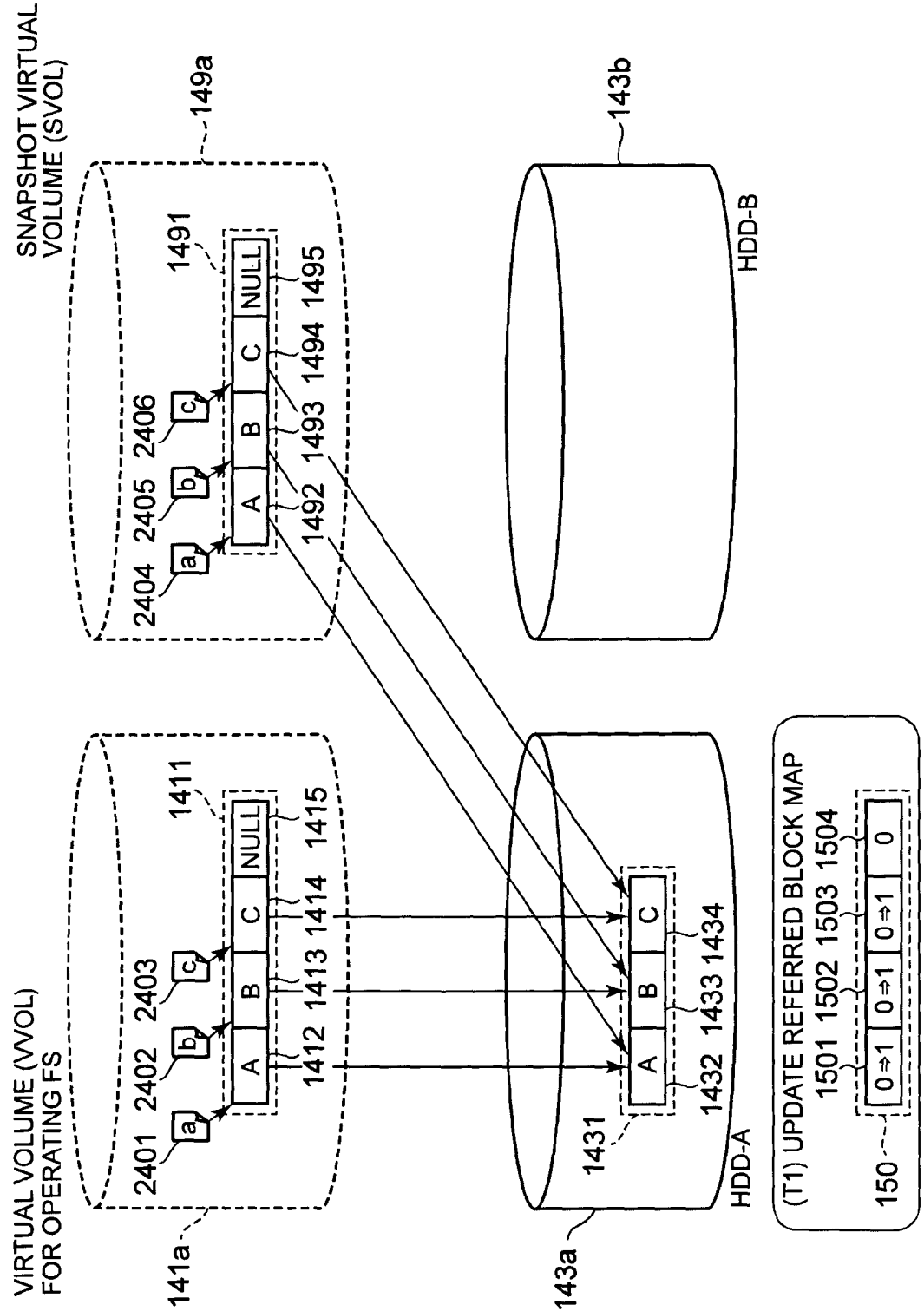
FIG. 24 is a first diagram which illustrates GC processing during a snapshot operation according to the second embodiment of the present invention.
Figure 25:
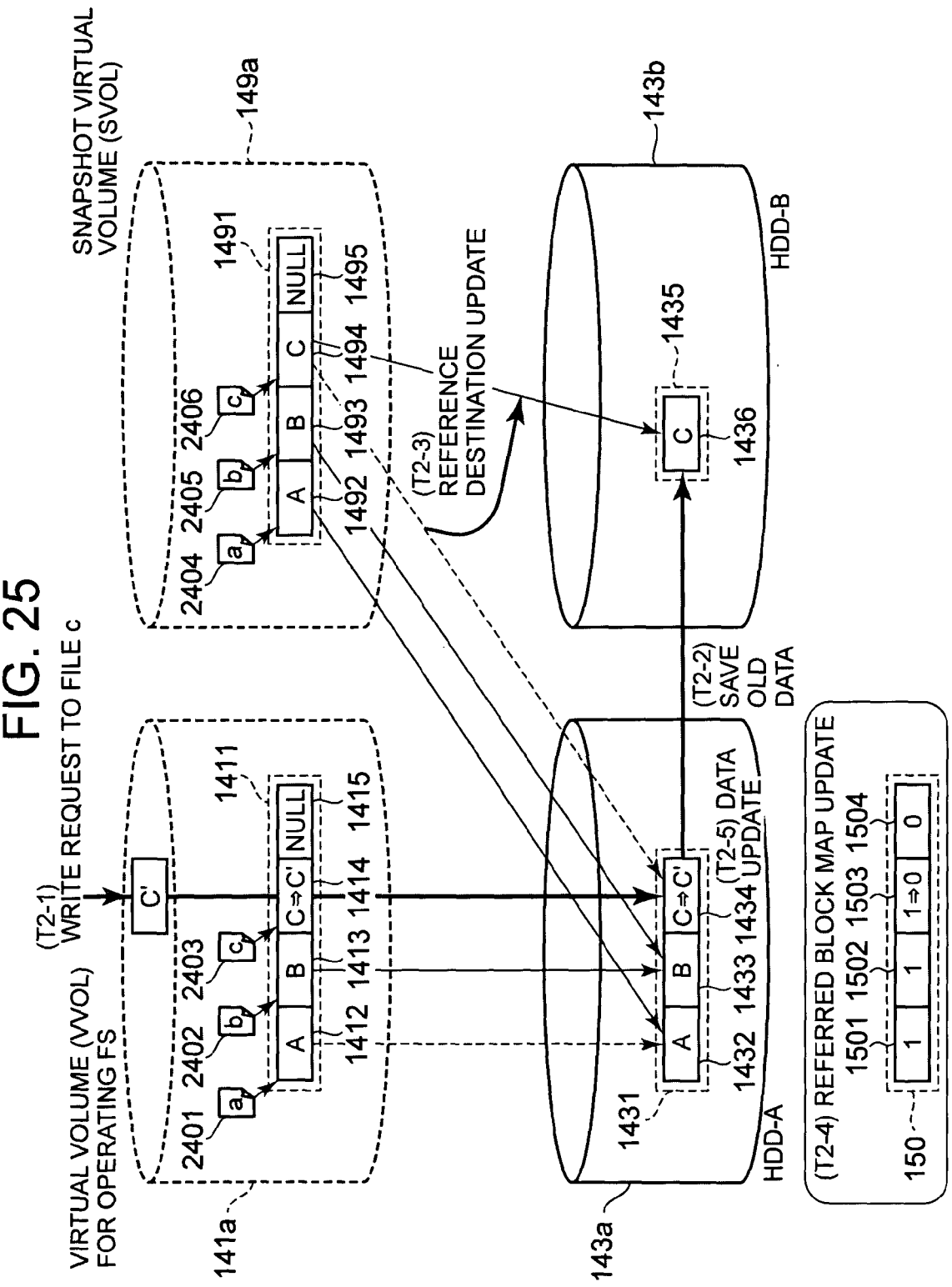
FIG. 25 is a second diagram which illustrates GC processing during a snapshot operation according to the second embodiment of the present invention.
Figure 26:
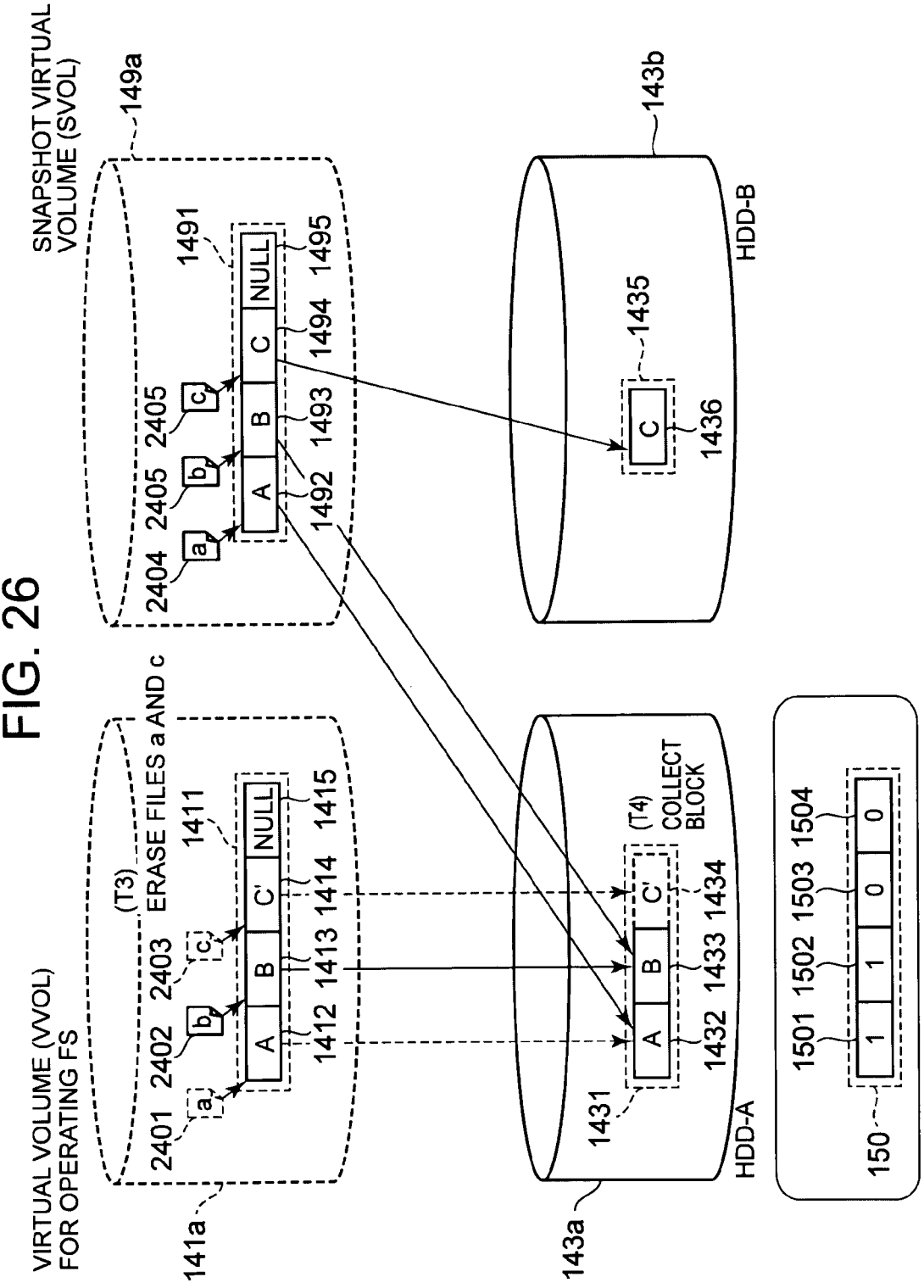
FIG. 26 is a third diagram which illustrates GC processing during a snapshot operation according to the second embodiment of the present invention.

FIGS. 24, 25, and 26 illustrate GC processing during a snapshot operation according to the second embodiment of the present invention. Although FIGS. 24, 25, and 26 illustrate an example in which each file is established in a single block size, the GC processing can be implemented in the same way even in cases where files are housed in a plurality of blocks.

FIG. 24 shows the state of the disk array 14 prior to the creation of a snapshot (time T0) and during the creation of the snapshot (time T1). FIG. 25 shows the state of the disk array 14 when adding to files of the operation file system (time T2) and FIG. 26 shows the state of the disk array 14 when some of the files of the operating file system are erased (time T3) and when performing GC processing with respect to invalid disk space (time T4).

As shown in FIG. 24, the disk array 14 comprises a VVOL 141a, an SVOL 149a, a physical disk 143a (HDD-A) for storing real data of the VVOL, and a physical disk 143b (HDD-B) for saving old data in order to maintain the SVOL. The physical disk 143a stores real data blocks 1431. In addition, the disk array 14 also comprises virtual data block groups 1411 and 1491 which store pointers for referencing the real data block group 1431 and a referred block map 150.

Time T0: Prior to Snapshot Creation

Here, at time T0, the managed files a, b, and c exist in the VVOL 141a as a result of the file system 134 of the host computer 13. In this case, the metadata 2401, 2402, and 2403 of each of the files a, b, and c managed by the file system 134 of the host computer 13 each reference the corresponding virtual data blocks 1412, 1413, and 1414 in the virtual data block group 1411 of the respective VVOL 141. The respective virtual data blocks 1412, 1413, and 1414 each reference the corresponding real data blocks 1432, 1433, and 1434 of the real data block groups 1431 of the physical disk 143a (HDD-A). The virtual data block 1415 of the virtual data block group 1411 does not have data written therein and therefore a real data block has not been allocated thereto. The real data blocks 1432, 1433, and 1434 each have real data of files (written as 'A', 'B', and 'C' in FIG. 24). At this point, because a VVOL snapshot has not been created, the respective bits of the referred block map 150 are all '0'.

Here, the metadata 2401, 2402, and 2403 of the files managed by the file system 134 and the virtual data block group 1411 are stored in real data blocks which have been allocated to physical disk 143a (HDD-A) or another physical disk, for example. The storage position of the file metadata is dependent on the mounting of the file system 134 of the host computer 13 and the storage position of the virtual data block group 1411 is dependent on the installation of the VVOL I/O processing program 148 of the disk array 14. The metadata and virtual data block group can be stored in an optional physical disk depending on the mounting.

Time T1: Snapshot Creation

In cases where an instruction to create a snapshot is generated, as shown in FIG. 24, the processor 14P which executes the VVOL I/O processing program 148 copies the virtual data block group 1411 of the VVOL 141a and creates the SVOL 149a. As a result, a virtual data block group (snapshot reference data) 1491 exists in the SVOL 149a. Here, when the file system 134 is mounted in the SVOL 149a, the same files a, b, and c as the VVOL 141a exists. The metadata 2404, 2405, and 2406 of the respective files a, b, and c managed by the file system 134 references the virtual data blocks 1492, 1493, and 1494 of the SVOL 149a. The respective virtual data blocks 1492, 1493, and 1494 reference the same real data blocks 1432, 1433, and 1434 as the virtual data blocks 1412, 1413, and 1414 of the VVOL 141a.

Thus, the real data blocks 1432, 1433, and 1434 of the virtual data blocks 1412, 1413, and 1414 of the VVOL 141a are referenced by the virtual data blocks 1492, 1493, and 1494 of the SVOL 149a. Hence, the processor 14P sets the bits 1501, 1502, and 1503 which correspond with each of the referenced blocks in the referred block map 150 to "1". The value of bit 1504 of the referred block map 150 which corresponds with the virtual data block 1415 to which real data have not been written remains unchanged as "0".

Time T2: When Writing New Data

As shown in FIG. 25, when the processor 14P which executes the VVOL I/O processing program 148 receives a request to write new data 'C' to file c in VVOL 141a (time T2-1), old data 'C' are saved from real data block 1434 to the real data block 1436 which has been newly allocated to the physical disk 143b (HDD-B) (time T2-2). Thereafter, processor 14P changes the reference destination of the virtual data block 1494 of the SVOL 149a from the previous real data block 1434 to the real data block 1436 of the data 'C' saving destination (time T2-3) and changes the value of the bit 1503 of the referred block map 150 from '1' to '0'. Thereafter, the processor 14P updates the content of the data block 1434 referenced by the data block 1414 of VVOL 141a to 'C'. Here, in cases where data block 1414 of the VVOL 141a is not required on the VVOL 141a because the bitmap 1503 of the referred block map 150 is '0' and is not referenced by the virtual block data of the SVOL 149a, collection can be performed without affecting the snapshot.

Time T3: When Erasing a File

When the processor 13P which executes the FS I/O processing program 134 of the host computer 13 accepts the erasure of the files a and c, the metadata 2401 and 2403 of files a and c are erased. In this case, the virtual data blocks 1412 and 1414 storing the file data and the real data blocks 1432 and 1434 which are the respective reference destinations remain. These virtual data blocks 1412 and 1414 constitute invalid disk space from the perspective of the file system 134 of the host computer 13. Here, the values of the bits of the referred block map 150 which correspond to the virtual data blocks 1412 and 1414 are '1' and '0' respectively.

Time T4: Collect Invalid Disk Space on VVOL

When the GC control program 131 is started up and executed by processor 13P in host computer 13, collection requests of the invalid disk space 1412 and 1414 on the VVOL 141a are sent to the disk array 14. Upon receipt of the collection requests, the processor 14P of the disk array 14 which executes the GC execution program 151 copies the content of the collection target bitmap field 13107 to a GC target bitmap 1421 (not shown in FIG. 26). Invalid disk space collection is carried out on the basis of the value of the GC target bitmap and the value of the referred block map 150. In this embodiment, the processor 14P does not perform collection with respect to invalid disk space 1412 because the value of the corresponding bit in the referred block map is '1', which indicates that the corresponding real data block 1432 has been referenced by the virtual data block 1492 of the SVOL 149a. However, processor 14P performs collection with respect to invalid disk space 1414 because the value of the corresponding bit of the referred block map 150 is '0', which indicates that the referenced real data block 2344 has not been referenced by the SVOL and, as a result, the real data block 1434 is collected.

Thus, the invalid disk space used by the operating file system can be collected without destroying the snapshot.

Various processing which is implemented as a result of the processor 14P executing the GC execution program 151 and the VVOL I/O processing program 148 will be described next.

GC Execution Processing

Figure 27:
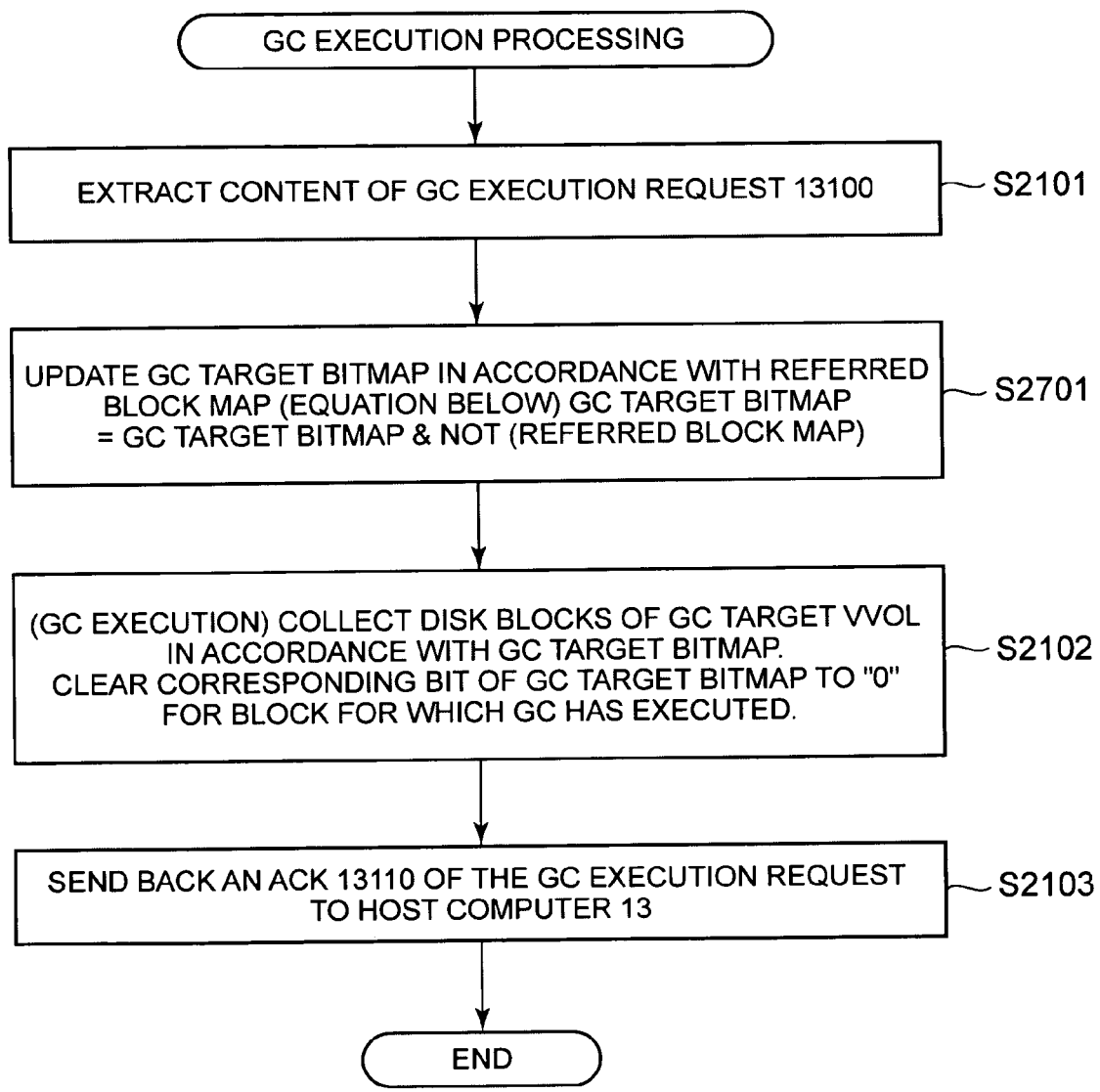
FIG. 27 is a flowchart showing GC execution processing according to the second embodiment of the present invention.

FIG. 27 is a flowchart showing GC execution processing according to the second embodiment of the present invention.

The GC execution processing is implemented as a result of the processor 14P executing the GC execution program 151. The same steps as those of the GC execution processing according to the first embodiment of FIG. 21 have the same reference numerals assigned thereto.

When the disk array 14 receives the GC execution request 13100 from the host computer 13, the processor 14P extracts the content of the GC execution request 13100 (step S2101). Thereafter, the processor 14P then updates the GC target bitmap 13107 in the GC execution request 13100 by using the referred block map 150 as indicated by the following equation (step S2701). That is, the processor 14P updates the GC target bitmap by taking the logical and (AND) of the GC target bitmap 13107 and the inverse of the referred block map 150 (NOT (referred block map 150)). Here, a '1' is established in the updated GC target bitmap for those bits which corresponds with real data blocks which have not been referenced by the SVOL, which are the real data blocks of the GC target.

Thereafter, the processor 14P executes the collection of the disk space on the basis of the GC target bitmap. In this embodiment, all of the blocks which correspond with bits for which a "1" has been established in the GC target bitmap are collected. Here, the virtual block data group 1411 which represents the relationship between the respective blocks of the virtual volume and the physical disk space of the physical disk allocated to the blocks is managed and the physical disk space of the physical disk can be collected by erasing information for referencing the physical disk space of the physical disk allocated to the GC target block in the data group. As a result, a situation where the SVOL is destroyed such as when real data blocks which have been referenced by the SVOL are collected can be suitably prevented.

Thereafter, with regard to blocks for which collection is complete, the processor 14P clears the bits corresponding with the blocks of the GC target bitmap to "0" and establishes a "1" for the corresponding bits in the collected block map which has bits which correspond with respective blocks (step S2102). Thereafter, processor 14P stores the collected block map in an ACK 13110 of the GC request of the physical disk, sends back the ACK to the host computer 13 and ends the processing.

VVOL I/O Processing

Figure 28:
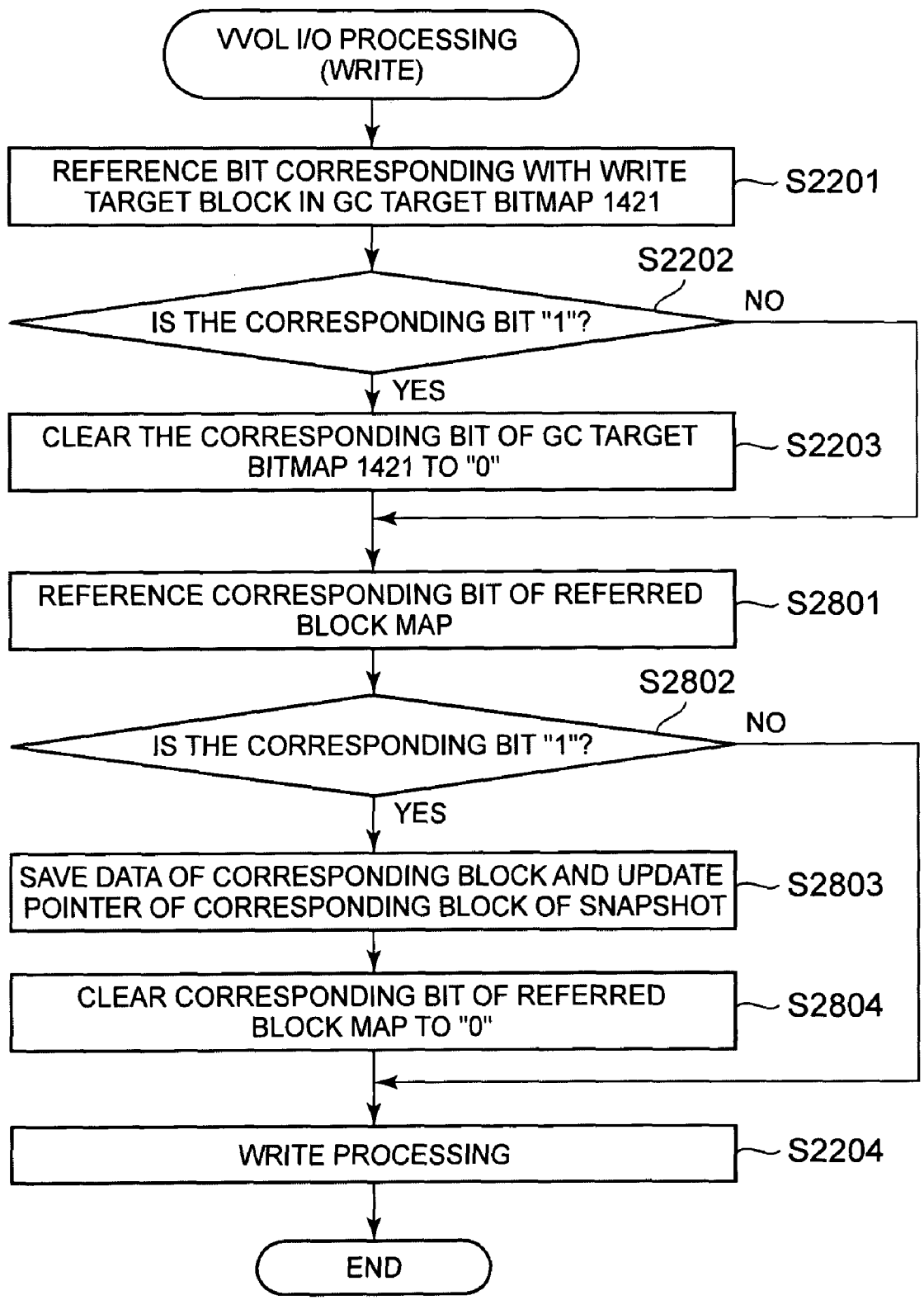
FIG. 28 is a flowchart showing VVOL I/O processing according to the second embodiment of the present invention.

FIG. 28 is a flowchart showing VVOL I/O processing according to the second embodiment of the present invention. FIG. 28 is a flowchart for a case where write processing of the VVOL I/O processing occurs while the GC execution processing is being executed. The same reference numerals are assigned to those steps which are the same as the steps of the VVOL I/O processing according to the first embodiment of FIG. 22.

The VVOL I/O processing is implemented as a result of the processor 14P executing VVOL I/O processing program 148.

When the disk array 14 receives a write request to write to the VVOL from the host computer 13 when the GC execution processing is being executed, the processor 14P references the bit which corresponds with the write target block in the GC target bitmap (step S2201) and evaluates whether the bit is "1" (step S2202). As a result, in cases where it is evaluated that the bit is "1" (step S2202: Yes), the processor 14P clears the corresponding bit in the GC target bitmap to "0" (step S2203) and moves to the following step S2801. However, in cases where it is evaluated that the bit is "0" (step S2202: No), the processor 14P moves to step S2801 without performing the corresponding bit operation.

The processor 14P then references the corresponding bit of the referred block map 150 (step S2801) and evaluates whether this bit is "1" (step S2802). As a result, in cases where it is evaluated that the bit is "1", the processor 14P saves the real data block corresponding with the block in the physical disk space of another disk and updates the pointer of the virtual data block 1491 of the snapshot (SVOL) (step S2803). Thereafter, the processor 14P clears the corresponding bit of the referred block map 150 to "0" (step S2804) and executes write processing to store the real data of the corresponding file in the physical disk space (step S2204) and ends the processing. However, in cases where it is evaluated that the corresponding bit is "0" (step S2802: No), the processor 14P executes write processing to store the real data of the corresponding file in the physical disk space (step S2204) without performing steps S2803 and 2804 and terminates the processing.

As a result of this processing, even in cases where writing is performed with respect to a block which is the GC target, because the GC target bitmap is then "0", collection is not performed in the GC execution processing. Hence, write processing can be executed in parallel with the GC processing and a drop in the processing efficiency can be prevented.

Furthermore, according to the above processing, when writing to the data of a real data block which has been referenced by the virtual block data of the SVOL occurs, the real data prior to the writing can be suitably saved and the state of referencing by the virtual block data of the SVOL with respect to the real data block can be suitably mirrored in the bit of the referred block map.

The second embodiment makes it possible to suitably collect invalid disk space which has been used by the operating file system without destroying the snapshot.

Third Embodiment

The computer system according to the third embodiment of the present invention will be described next.

Figure 29:
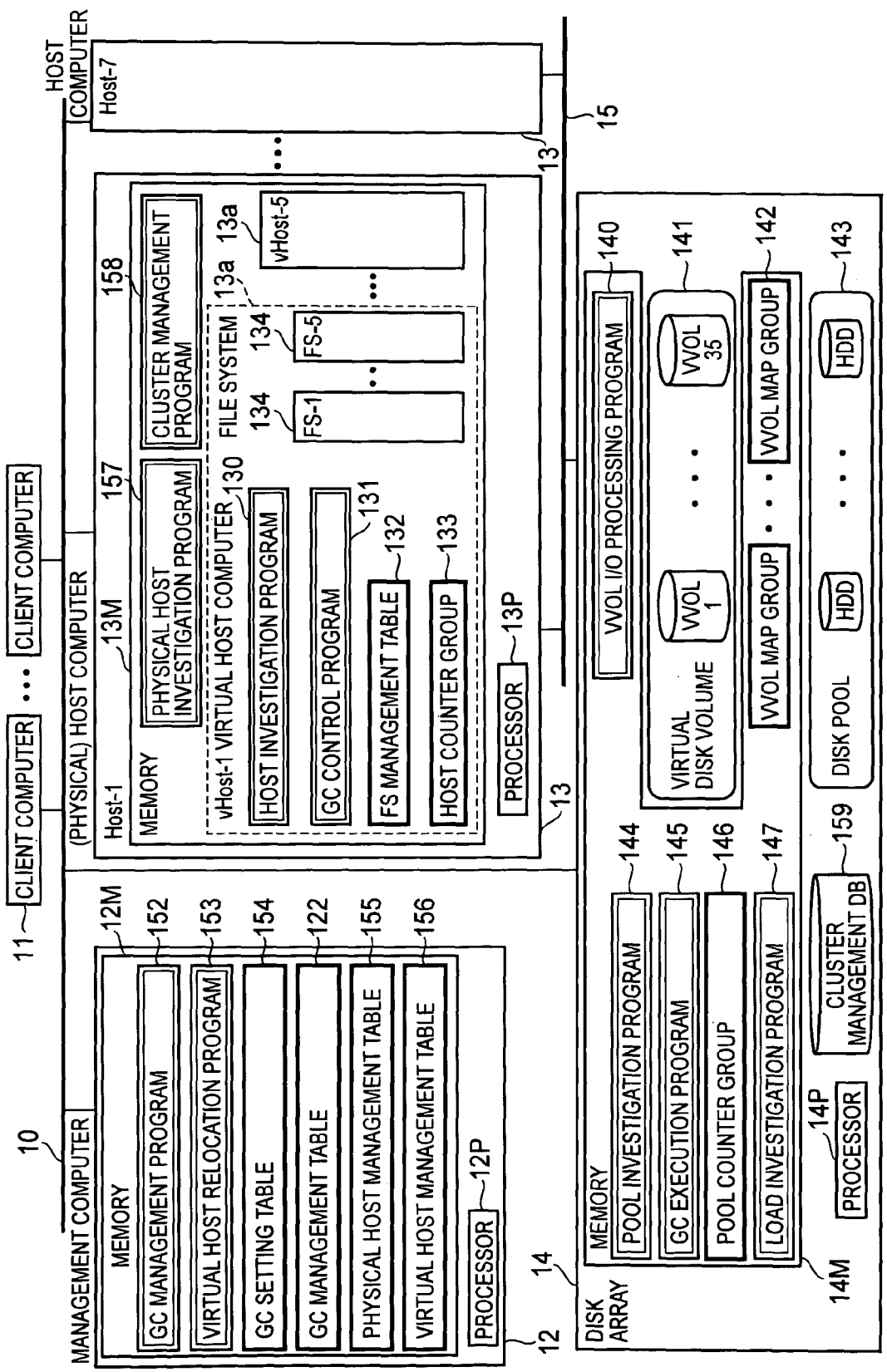
FIG. 29 is a block diagram showing the overall configuration of a computer system according to a third embodiment of the present invention.

FIG. 29 is a block diagram which shows the overall configuration of the computer system according to the third embodiment of the present invention. In FIG. 29, the same reference numerals are assigned to elements which are the same as those of the computer system according to the first embodiment.

The computer system according to the third embodiment implements the functions of the host computer 13 according to the first embodiment by means of a virtual host computer (generally called a virtual OS (Operating system) and also referred to as the 'virtual host' hereinbelow) 13a which runs on the host computer 13. A plurality of virtual host computers 13a is able to run on the host computer 13. The third embodiment describes the host computer 13 as a physical host computer (physical computer) 13. Here, the description will focus on the differences from the first embodiment.

The memory 12M of the management computer 12 stores a GC management program 152 for managing the collection of physical disks which is executed by the processor 12P, a virtual host relocation program 153 for relocating the virtual host computer 13a in another physical host computer 13, a GC setting table 154 which stores system settings for disk collection, a GC management table 122 which stores temporary information required for the collection of the physical disks, a physical host management table 155 which stores the CPU utilization (first utilization) and the number of virtual hosts and so forth of the physical host computers 13, and a virtual host management table 156 which stores the load and the amount of invalid disk space of the virtual host computers 13a.

GC Setting Table 154

FIG. 30 shows an example of a GC setting table according to the third embodiment of the present invention. The same reference numerals are assigned to parts which are the same as those of the GC setting table 121 according to the first embodiment shown in FIG. 2.

The GC setting table 154 is constituted by newly providing the GC setting table 121 according to the first embodiment with a permitted migration CPU utilization field 1541 in order to use the maximum utilization stored in the maximum CPU utilization field 1214 for a different purpose.

When collecting the physical disk space which is being utilized by the virtual host computers 13a, the maximum CPU utilization field 1214 stores the CPU (processor) utilization (maximum CPU utilization) as a threshold value when relocating the virtual host computers in another physical host computer 13. In cases where the CPU utilization of the physical host computer 13 is equal to or more than the maximum CPU utilization, the virtual host computers 13a of the physical host computer 13 are relocated.

The permitted migration CPU utilization field 1541 stores the CPU utilization which constitutes a threshold value for the virtual host computers 13a permitted to relocate to another physical host computer 13 (permitted migration CPU utilization). In cases where the CPU utilization by the virtual host computers 13a is equal to or less than the permitted migration CPU utilization, the virtual host computers 13a are relocated.

Physical Host Management Table 155

FIG. 31 shows an example of a physical host management table according to the third embodiment of the present invention.

The physical host management table 155 comprises an ID field 1551, a host name field 1552, an investigation virtual host number field 1553, an investigation CPU utilization field 1554, a virtual host number increase/reduction field 1555, a post-migration virtual host number field 1556, and a post-migration CPU utilization field 1557.

The ID field 1551 stores the identification numbers (ID) of the physical host computers 13. The host name field 1552 stores the names (host names) of the physical host computers 13. The investigation virtual host number field 1553 stores the numbers of virtual host computers at the point the investigation takes place. The investigation CPU utilization field 1554 stores the utilization (first utilization) of the processors of the physical host computers 13 at the time of the investigation. The virtual host number increase/reduction field 1555 stores increases/reductions in the numbers of virtual host computers. The post-migration virtual host number field 1556 stores the number of post-migration virtual host computers. The post-migration CPU utilization field 1557 stores the utilization of the processors of the post-migration physical host computers 13.

Virtual Host Management Table 156

FIG. 32 shows an example of a virtual host management table according to the third embodiment of the present invention. The parts which are the same as those of the host management table 123 according to the first embodiment shown in FIG. 6 are assigned the same reference numerals.

The virtual host management table 156 is obtained by newly providing the host management table 123 according to the first embodiment with a physical host name field 15601 and a migration destination physical host field 15602 for the storage of data relating to the virtual host computers 13a instead of data relating to the host computers 13.

The host ID field 12300 stores the IDs of the virtual host computers 13a. The host name field 12301 stores the names of the virtual host computers 13a. The physical host name field 15601 stores the IDs of the physical host computers 13. The migration destination physical host field 15602 stores the names of the physical host computers 13 which constitute the migration destinations.

Physical Host Computer 13

Returning now to the description of FIG. 29, the host computer 13 comprises a memory 13M for storing various programs and various tables and a processor (CPU) 13P which executes various processing in accordance with the programs in memory 13M.

Memory 13M stores a physical host investigation program 157, a cluster management program 158, and a program and so forth required for the operation of the virtual host computer 13a. The program and so forth required for the operation of the virtual host computers 13a is the same as the program and so forth stored in the host computer 13 according to the first embodiment. According to this embodiment, the physical host computer 13 permits the construction of a plurality of virtual host computers 13a.

The physical host investigation program 157 investigates the utilization of the processor of the physical host computer 13 as a result of being executed by the processor 13P. For example, the physical host investigation program 157 can be implemented by utilizing the sar command of the Linux (registered trademark) OS.

The cluster management program 158 is executed by the processor 13P and is able to implement processing to manage the virtual host computers 13a which run on the physical host computer 13 and able to implement processing (failover) to allow the virtual host computers 13a to migrate to another physical host computer 13, for example.

The processing by the computer system according to the third embodiment will be described next.

GC Management Processing

FIG. 33 is a flowchart showing GC management processing according to the third embodiment of the present invention. The same reference numerals are assigned to parts which are the same as those of the GC management processing according to the first embodiment shown in FIG. 12.

The GC management processing is performed as a result of the processor 12P in the management computer 12 executing the GC management program 152.

The processor 12P first executes program initialization processing to initialize a table relating to collection management (step S3301). In the program initialization processing, the processor 12P reads the GC setting table 154 and initializes the GC management table 122, the physical host management table 155 and the virtual host management table 156.

Thereafter, the processor 12P executes disk pool free disk space monitoring processing which monitors the free disk space of the disk pool disk space (step S1202).

Further, the processor 12P moves the processing to the next physical host investigation processing (step S3302) in cases where the free disk space amount of the disk pool is smaller than the amount of GC start free disk space (1222). As a result, the collection of the physical disks of the disk pool 143 is subsequently started.

The processor 12P executes physical host investigation processing to gather information such as the CPU utilization of the physical host computer 13 and the number of virtual host computers (step S3302). In the physical host investigation processing, the processor 12P issues a physical host investigation request to the processor 13P which executes the physical host investigation program 157 of the physical host computer 13 registered in the physical host management table 155 and registers the CPU utilization and the number of virtual hosts which are the return values in the physical host management table 155. The processor 12P moves the processing to the following virtual host investigation processing (S3303) when the investigation is complete for all of the physical host computers 13 registered in the physical host management table 155.

The processor 12P executes virtual host investigation processing which gathers load information and information such as the amount of invalid disk space of the virtual host computers 13a (step S3303). In the virtual host investigation processing, the processor 12P issues a host investigation request 1251 to the processor 13P which executes the host investigation program 130 of the virtual host computers 13a registered in the virtual host management table 156 and registers the CPU utilization (second utilization), the total number of file systems, the total invalid disk space amount, the number of GC target file systems, and the GC target invalid disk space amount which are the return values in the virtual host management table 156. The processor 12P moves the processing to the following GC control processing (S3304) upon completion of the investigation for all of the virtual host computers 13a registered in the virtual host management table 156.

The processor 12P executes the GC control processing which collects the disk space of the disk array 14 (step S3304). In the GC control processing, the processor 12P compares the investigation result of the respective virtual host computers 13a registered in the virtual host processing table 156 and determines the disk collection amount and GC execution order requested by each virtual host computer 13a. Thereafter, the processor 12P issues the GC control request 1270 to the processor 13P which executes the GC control program 131 of each virtual host computer 13a in accordance with the GC execution order thus determined and collects the physical disk space. In cases where the collection condition is satisfied or in cases where the invalid disk space of all of the virtual host computers 13 constituting the target has been collected, the processor 12P returns the processing to disk pool free disk space monitoring processing (S1202).

GC Control Processing 3000

Figure 34:
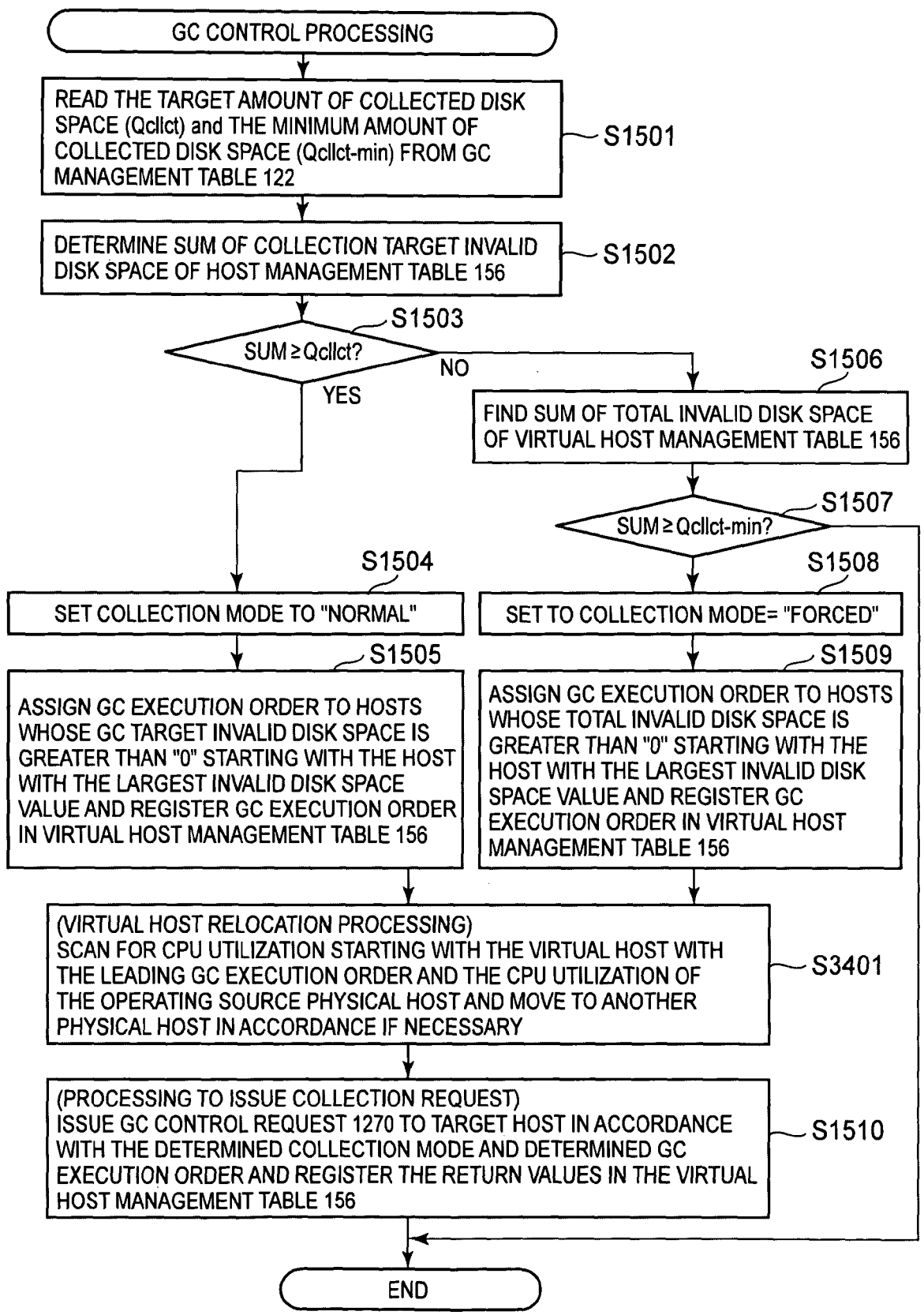
FIG. 34 is a flowchart showing GC control processing according to the third embodiment of the present invention.

FIG. 34 is a flowchart showing the GC control processing according to the third embodiment of the present invention. The GC control processing according to the third embodiment differs in that processing is performed by using the virtual host management table 156 in place of the host management table 123 in the GC control processing according to the first embodiment and in that step S3401 is newly executed. Reference numerals which are the same as those of the first embodiment are assigned to substantially similar steps.

In the GC control processing according to the third embodiment, after registering the assigned order in the GC execution order field 12304 of the virtual host management table 156 in step S1505 or step S1509, the processor 12P executes virtual host relocation processing (step S3401).

In the virtual host relocation processing, the processor 12P which executes the virtual host relocation program 153 scans the CPU utilization of the virtual host computers 13a in order starting with the virtual host computer 13a with the leading GC execution order and the CPU utilization of the running source physical host computers 13 and relocates the virtual host computers 13a to another physical host computer 13 if necessary.

After executing the virtual host relocation processing, the processor 12P issues an GC control request 1270 to the virtual host computer 13a in accordance with the collection mode and GC execution order determined in steps S1504 and S1505 or steps S1508 and S1509, receives the return value data 12710 and registers same in the virtual host management table 156 (step S1510) before ending the processing.

Virtual Host Relocation Processing

FIG. 35 is a flowchart showing virtual host relocation processing according to the third embodiment of the present invention.

The virtual host relocation processing is implemented as a result of the processor 12P executing the virtual host relocation program 153.

The processor 12P selects the physical host computer for which the subsequent steps have not been implemented and with the smallest ID among the physical host computers 13 registered in the physical host management table 155 as the migration source physical host computer (step S3501). Thereafter, the processor 12P acquires the CPU utilization of the migration source physical host computer 13 from the physical host management table 155 (step S3502), evaluates whether the CPU utilization is equal to or more than the maximum CPU utilization of the GC setting table 154 (step S3503) and, in cases where it is evaluated that the CPU utilization is less than the maximum CPU utilization, it is thought that there is barely any effect whereby the collection processing reduces the efficiency of the processing of the physical host computer 13. The processing therefore moves to step S3510.

However, in cases where it is evaluated that the CPU utilization is equal to or more than the maximum CPU utilization, the processor 12P selects the virtual host computer with the smallest GC execution order among the virtual host computers 13a registered in the virtual host management table 156 which is running on the migration source physical host computer 13 and for which relocation has not taken place as the target virtual host computer 13a (step S3504).

Thereafter, the processor 12P acquires the CPU utilization of the target virtual host computer 13a from the virtual host management table 156 (step S3505) and evaluates whether the acquired CPU utilization is equal to or less than the permitted migration CPU utilization of the GC setting table 154 (step S3506).

In cases where it is evaluated that the CPU utilization is equal to or less than the permitted migration CPU utilization (step S3506: Yes), the processor 12P selects the physical host computer with the smallest CPU utilization from among the physical host computers 13 registered in the physical host management table 155 as the migration destination physical host computer 13 (step S3507). The processor 12P then asks the processor 13P which executes the cluster management program 158 of the migration source physical host computer 13 to migrate (relocate) the target virtual host computer 13a to the migration destination physical host computer 13. As a result, the processor 13P of the migration source physical host computer 13 performs processing to migrate the target virtual host computer 13a to the migration destination physical host computer 13 and sends back the execution result to the management computer 12. The processor 12P of the management computer 12 receives the execution result of the migration processing of the virtual host computer 13a from the processor 13P of the migration source physical host computer 13 (step S3508) before investigating the CPU utilization of the migration source physical host computer 13 and updating the corresponding field of the physical host management table 155 (step S3509) and then moves to step S3510.

However, in cases where it is judged that the CPU utilization of the target virtual host computer 13a is greater than the permitted migration utilization (step S3506: No), the processor 12P moves to step S3510 without migrating the target virtual host computer 13a.

In step S3510, the processor 12P judges whether all of the virtual host computers 13a running on the migration source physical host computer 13 are targets, and in cases where all of the virtual host computers 13a are targets, moves to the following step S3511. However, in cases where not all of the virtual host computers 13a are targets, the processor 12P moves to step S3502.

In step S3511, the processor 12P judges whether all of the physical host computers 13 are targets, ending the processing in cases where all of the physical host computers 13 are targets but moving to step S3501 in cases where not all of the physical host computers 13 are targets.

As a result of this processing, the virtual host computer 13a of the physical host computer 13 with the highest CPU utilization can be suitably migrated to the physical host computer 13 with the lowest CPU utilization and the effect on other processing when the collection of the physical disk space is performed can be effectively suppressed.

Furthermore, in the above processing, migration of the target virtual host computer 13a is performed when the CPU utilization thereof is equal to or less than the permitted migration utilization, otherwise migration does not take place. This condition is established for the following reasons.

In order to migrate the virtual host computer 13a to another physical host computer 13, it is necessary to perform processing such as (1) the stoppage of services of the virtual host computer 13a (I/O stoppage), (2) the writing of dirty data to physical disks, (3) the discarding of cache data, and (4) the restarting of services (I/O restart), and so forth.

Here, when the migration of a comparatively high-load virtual host computer 13a is considered, data that have not been mirrored in a physical disk (dirty data) in a relatively high-load virtual host computer 13a are cached in large quantities in the memory 13M. Hence, when migration takes place, a rapid I/O increase to the disk array 14 occurs in order to mirror the dirty data in the disk array 14. In addition, because the quantity of written dirty data is large, the time taken to write the dirty data increases and the service stoppage time also increases as a result. In addition, a large quantity of cache is discarded and the performance drops further following the migration of the virtual host computer 13a than prior to the migration.

Thus, a demerit occurs when migrating a relatively high-load virtual host computer 13a. Therefore, in this embodiment, a virtual host computer 13a with a utilization equal to or less than the permitted migration utilization is migrated in order to prevent the occurrence of such a demerit as far as possible.

Although the present invention was described on the basis of the embodiments hereinabove, the present invention is not limited to the above embodiments and is applicable to a variety of other modes.

For example, in the above embodiments, the processor 12P in the management computer 12 may gather the CPU utilization from the respective host computers 13 or may determine the GC execution order on the basis of the CPU utilization. In this case, host computers 13 whose CPU utilization is at a certain level or more are excluded from the physical disk space collection target, for example.

In addition, the processor 12P of the management computer 12 may gather data of the free disk space amount (spare capacity) in the main memory of the respective host computers 13 and determine the GC execution order based on the data of the free disk space amount of the main memory. In this case, for example, a host computer 13 may be excluded from the physical disk space GC target in cases where the free disk space amount of the main memory is equal to or less than a predetermined value.

In addition, in the above embodiment, attribute information which designates removal from the GC target is stored in the host computer 13 to be excluded from the GC target and the management computer 12 may also exclude the corresponding host computer 13 from the GC target on the basis of the attribute information.

Moreover, attribute information designating the removal from the physical disk space collection target can be stored and managed in the host computer 13 in association with the file system and the host computer 13 may also exclude the corresponding file system from the GC target on the basis of the attribute information.

What is claimed is:

1. A computer system having a disk pool supply device which has a disk pool constituted by a physical disk space of one or more physical disks, a virtual volume management device which dynamically allocates the physical disk space belonging to the disk pool to a storage disk space of a virtual volume, a plurality of host computers which have a file system for managing files by using the storage disk space of the virtual volume, and a management computer for managing the host computers and the virtual volume management device, wherein the management computer comprises:
a threshold value storage unit which stores a predetermined threshold value which is used in a comparison with a free disk space amount of the disk pool;
a free disk space amount acquisition unit which acquires the free disk space amount of the disk pool from the virtual volume management device;
an invalid disk space amount acquisition unit which acquires from the plurality of host computers, an amount of an invalid disk space in the virtual volume, which is a disk space to which the physical disk space has been allocated but in which the files are not stored;
a host determination unit which determines a host computer which instructs collection of the physical disk space allocated to the invalid disk space on the basis of the amount of the invalid disk space;
a free disk space amount judgment unit which judges whether the free disk space amount of the disk pool is smaller than the threshold value; and
a collection request unit which transmits a collection request for the physical disk space allocated to the invalid disk space to the determined host computer after judging that the free disk space amount of the disk pool is smaller than the threshold value,
the host computers each comprises:
an invalid disk space amount detection/transmission unit which detects the amount of the invalid disk space in the virtual volume and transmits the amount of the invalid disk space to the management computer; and
an invalid disk space position information transmission unit which, in cases where the collection request is received from the management computer, generates invalid disk space position information which indicates a position of invalid disk space in the virtual volume, and transmits the invalid disk space position information to the virtual volume management device, and
the virtual volume management device comprises:
a physical free disk space amount transmission unit which transmits the free disk space amount of the disk pool to the management computer; and
a collection unit which receives the invalid disk space position information from the host computer and collects the physical disk space of the physical disk allocated to the storage disk space of the virtual volume on the basis of the invalid disk space position information.

2. The computer system according to claim 1, wherein the management computer comprises:
a capacity reception unit which receives a capacity of the disk pool from the virtual volume management device;
a proportion storage unit which stores a proportion of the threshold value with respect to the capacity of the disk pool; and
a threshold value calculation unit which calculates the threshold value by multiplying the proportion by the capacity of the disk pool and stores the threshold value in the threshold value storage unit.

3. The computer system according to claim 1, wherein the host computer further comprises:
a written map information storage unit which stores written map information in the virtual volume, which indicates storage disk space in which writing of the files is carried out; and
a file system map information storage unit which stores file system map information which indicates the storage disk space in the virtual volume, in which the files are stored, wherein
the invalid disk space detection/transmission unit specifies the invalid disk space and detects the amount of the invalid disk space on the basis of the written map information and the file system map information.

4. The computer system according to claim 1, wherein the host computer comprises a counter which counts the amount of the invalid disk space, and
the invalid disk space detection/transmission unit increments the counter by the quantity of the storage disk spaces when erasing the files from the storage disk space of the virtual volume and detects the amount of the invalid disk space from a value of the counter.

5. The computer system according to claim 1, wherein the host computer comprises:
a plurality of file systems which manage files by using the storage disk spaces of different virtual volumes; and
a target file system determination unit which determines a file system constituting a target for collecting the physical disk space from among the plurality of file systems on the basis of a predetermined condition, wherein
the invalid disk space position information transmission unit generates and transmits the invalid disk space position information of the target file system.

6. The computer system according to claim 5, wherein the target file system determination unit determines file systems, which have a large amount of invalid disk space, as collection targets.

7. The computer system according to claim 5, wherein the target file system determination unit excludes file systems whose I/O load exceeds a predetermined value from the collection targets.

8. The computer system according to claim 5, wherein
the host computer further comprises an excluded information storage unit which stores information specifying the file system to be excluded from the collection targets; and
the target file system determination unit excludes the file systems which correspond with the information stored in the excluded information storage unit from the collection targets.

9. The computer system according to claim 1, wherein
the management computer further comprises a utilization acquisition unit which acquires processor utilization from the host computers, and
the host determination unit excludes host computers, for which the processor utilization is equal to or more than a predetermined value, from the targets for which a collection instruction has been issued.

10. The computer system according to claim 1, wherein
the management computer further comprises a free disk space amount acquisition unit which acquires the free disk space amount of the main memory from the host computers, and
the host determination unit excludes host computers, for which the free disk space amount of a main memory is equal to or less than a predetermined amount, from the targets for which a collection instruction has been issued.

11. The computer system according to claim 1, wherein
the host computer further comprises a host exclusion information storage unit which stores host exclusion information indicating that the host computer has been excluded from the collection target, and
the management computer further comprises a host exclusion information reception unit which acquires the host exclusion information, and
the host determination unit excludes the host computer which corresponds with the host exclusion information from the target for which a collection instruction has been issued.

12. The computer system according to claim 1, wherein
the virtual volume management device further comprises a referenced map information storage unit which stores referenced map information indicating whether the physical disk space which stores real data of the files managed by the file system has been referenced by snapshot reference data for these files, and
the collection unit excludes the physical disk space which has been referenced by the snapshot reference data from the collection target on the basis of the referenced map information.

13. The computer system according to claim 12, wherein the virtual volume management device comprises:
a snapshot processing unit which creates snapshot reference data for referencing real data of the files managed by the file system at a predetermined time;
a referenced map creation unit which creates the referenced map information indicating that the physical disk space which stores the real data has been referenced by the snapshot reference data and stores the referenced map information in the referenced map information storage unit;
a reference destination update unit which stores pre-update real data in another physical disk space when updating the real data of the files to new real data, and updates the reference destination of the snapshot reference data to the other physical disk space;
a real data update unit which stores the new real data of the files in the physical disk space; and
a referenced map update unit which creates referenced map information indicating that the physical disk space in which the new real data are stored has not been referenced by the snapshot reference data, and stores the referenced map information in the referenced map storage unit.

14. The computer system according to claim 1, wherein
the host computer is a virtual host computer which is disposed on a physical computer, and
the management computer further comprises:
a first utilization acquisition unit which acquires a first utilization of the processor from the physical computer; and
a relocation unit which relocates at least one virtual host computer that is disposed on a physical computer for which the utilization of the processor is equal to or more than a predetermined value to another physical computer.

15. The computer system according to claim 14, wherein
the management computer further comprises a second utilization acquisition unit which acquires a second utilization of the processor of the physical computer by the virtual host computer,
the relocation unit relocates a virtual host computer, for which the second utilization is equal to or less than a predetermined value, among a plurality of virtual host computers disposed on the physical computer to the other physical computer.

16. A physical disk collection method of a computer system having a disk pool supply device which has a disk pool constituted by a physical disk space of one or more physical disks, a virtual volume management device which dynamically allocates the physical disk space belonging to the disk pool to a storage disk space of a virtual volume, a plurality of host computers which have a file system for managing files by using the storage disk space of the virtual volume, and a management computer for managing the host computers and the virtual volume management device, the method comprising:
a free disk space amount acquisition step in which a free disk space amount acquisition unit of the management computer acquires a free disk space amount in the disk pool from the virtual volume management device;
an invalid disk space amount acquisition step in which the invalid disk space amount acquisition unit of the management computer acquires in the virtual volume, from the plurality of host computers, an amount of the invalid disk space which is a disk space to which the physical disk space has been allocated but in which files are not stored;

a determination step in which a host determination unit of the management computer determines a host computer which instructs collection of the physical disk space allocated to the invalid disk space on the basis of the amount of the invalid disk space;

a free disk space amount judgment step in which a free disk space amount judgment unit of the management computer judges whether a free disk space amount is smaller than a predetermined threshold value which is used in a comparison with the free disk space amount of the disk pool stored in a threshold value storage section;

a collection request step in which a collection request unit of the management computer transmits a collection request for the physical disk space allocated to the invalid disk space to the determined host computer after judging that the free disk space amount is smaller than the threshold value;

an invalid disk space position information transmission step in which an invalid disk space position information transmission unit of the host computer generates invalid disk space position information which indicates a position of the invalid disk space in the virtual volume in cases where the collection request is received, and transmits the invalid disk space position information to the virtual volume management computer; and a collection step in which a collection unit of the virtual volume management device collects the physical disk space of the physical disk allocated to the storage disk space of the virtual volume on the basis of the invalid disk space position information.

17. A computer system having a disk pool constituted by a physical disk space of one or more physical disks, a disk array which dynamically allocates a physical storage space which belongs to the disk pool to the storage disk space of a virtual volume, a plurality of host computers which have a file system for managing files by using the storage disk space of the virtual volume, and a management computer for managing the host computers and the disk array, wherein the management computer comprises a first memory and a first processor, wherein the first memory stores a predetermined threshold value which is used in a comparison with the disk space amount of the disk pool, and the first processor acquires the free disk space amount in the disk pool from the disk array, acquires, from the plurality of host computers, an amount of the invalid disk space in the virtual volume, which is a disk space to which the physical disk space has been allocated but in which files are not stored, determines a order of the host computers which instruct collection of the physical disk space allocated to the invalid disk space on the basis of the amount of the invalid disk space, judges whether the free disk space amount is smaller than the threshold value, and transmits a collection request for the physical disk space allocated to the invalid disk space to the host computer in accordance with the determined order after judging that the free disk space amount is smaller than the threshold value;

the host computer each comprises a second memory and a second processor, wherein the second memory stores written disk space position information indicating the position of storage disk space, to which the physical disk space of the virtual volume has been allocated, and file position information indicating storage disk space, in which the files of the virtual volume are stored, and the second processor reports the amount of the invalid disk space to the management computer and, in cases where a collection request for physical disk space which has been allocated to the invalid disk space is received from the management computer, generates invalid disk space position information indicating the position of the invalid disk space in the virtual volume on the basis of the written disk space position information and the file position information, and transmits the invalid disk space position information to the disk array; and the disk array comprises a third processor, wherein the third processor transmits a free disk space amount of the disk pool to the management computer and collects the physical disk space of the physical disk allocated to the storage disk space of the virtual volume on the basis of the invalid disk space position information received from the host computer.

* * * * *